(12) United States Patent
Shoap

(10) Patent No.: US 7,819,345 B2
(45) Date of Patent: Oct. 26, 2010

(54) METHOD AND SYSTEM FOR FLUID TRANSMISSION ALONG SIGNIFICANT DISTANCES

(76) Inventor: Stephen D. Shoap, 12 Sheffield Rd., Wakefield, MA (US) 01880

( * ) Notice: Subject to any disclaimer, the term of this patent is extended or adjusted under 35 U.S.C. 154(b) by 163 days.

(21) Appl. No.: 12/211,517

(22) Filed: Sep. 16, 2008

(65) Prior Publication Data
US 2009/0071665 A1 Mar. 19, 2009

Related U.S. Application Data

(60) Provisional application No. 60/994,080, filed on Sep. 17, 2007, provisional application No. 61/125,690, filed on Apr. 28, 2008.

(51) Int. Cl.
*B05B 15/08* (2006.01)
(52) U.S. Cl. .......... 239/588; 239/69; 239/195; 239/302; 169/13; 169/24; 137/355.12; 137/565.3; 174/15.6; 174/47; 439/191; 439/194
(58) Field of Classification Search ........... 239/128, 239/135, 67, 69, 171, 195, 450, 525, 588, 239/302; 169/13, 24, 48, 49, 53, 70; 137/355.12, 137/565.01, 565.12, 565.3; 174/15.6, 47; 439/191, 192, 194
See application file for complete search history.

(56) References Cited

U.S. PATENT DOCUMENTS

| | | | | |
|---|---|---|---|---|
| 746,110 | A | * 12/1903 | Lasher | .......... 239/525 |
| 1,694,574 | A | * 12/1928 | Witter et al. | .......... 239/195 |
| 2,817,205 | A | 12/1957 | Muller | |
| 2,890,532 | A | 6/1959 | Ellison | |
| 3,054,198 | A | 9/1962 | George et al. | |
| 3,176,773 | A | 4/1965 | Headrick et al. | |
| 3,193,017 | A | 7/1965 | Walker | |
| 3,273,651 | A | * 9/1966 | Andrews | .......... 169/53 |
| 3,330,602 | A | 7/1967 | Riley et al. | |
| 3,372,875 | A | * 3/1968 | Torrey | .......... 169/24 |
| 3,593,804 | A | 7/1971 | Snider | |
| 3,763,581 | A | 10/1973 | Wolfston | |
| 3,964,182 | A | 6/1976 | Pomeret et al. | |
| 3,975,843 | A | 8/1976 | Ellison | |
| 4,095,752 | A | 6/1978 | Pomeret et al. | |
| D287,367 | S | 12/1986 | Woods | |
| 4,757,622 | A | 7/1988 | Morris | |
| 4,799,320 | A | 1/1989 | West et al. | |
| 4,843,743 | A | 7/1989 | Durieux | |
| 4,993,665 | A | 2/1991 | Sparling | |
| 5,044,445 | A | 9/1991 | Kayahara | |
| 5,165,482 | A | 11/1992 | Smagac et al. | |
| 5,909,983 | A | 6/1999 | McGee, Jr. | |
| 6,079,501 | A | 6/2000 | Schmidt | |
| 6,250,570 | B1 | 6/2001 | Starr et al. | |

(Continued)

*Primary Examiner*—Steven J Ganey
(74) *Attorney, Agent, or Firm*—Hayes Soloway P.C.

(57) ABSTRACT

The system contains a plurality of conduit segments and at least one electrically-powered pump. At least one conduit connector joins the conduit segments and the electrically-powered pumps, thereby mating at least one fluid path. A plurality of electric power wires are coupled with the conduit segments and connected to the electrically-powered electric pumps. At least one electrical connector, within said conduit connectors, mates corresponding electric power wires between the conduit segments. An electric power source electrically connected to the electrically-powered pump via the electric power wires.

26 Claims, 28 Drawing Sheets

U.S. PATENT DOCUMENTS

| | | |
|---|---|---|
| 6,431,465 B1 | 8/2002 | Yie |
| 6,651,900 B1 | 11/2003 | Yoshida |
| 6,685,104 B1 | 2/2004 | Float et al. |
| 6,772,562 B1 | 8/2004 | Dadamo |
| 6,834,813 B1 * | 12/2004 | Nobi .................. 239/195 |
| 6,904,977 B2 | 6/2005 | Zerrer et al. |
| 7,275,604 B1 | 10/2007 | Wall |
| 2002/0096339 A1 | 7/2002 | Yen |
| 2004/0050556 A1 | 3/2004 | Baker et al. |
| 2004/0244996 A1 | 12/2004 | Kravkov |
| 2005/0247362 A1 | 11/2005 | Harcourt et al. |
| 2006/0180321 A1 | 8/2006 | Yoshida |
| 2006/0252292 A1 | 11/2006 | Sonderegger et al. |
| 2007/0056753 A1 | 3/2007 | Serrano Molina |
| 2007/0185625 A1 | 8/2007 | Pillar et al. |

* cited by examiner

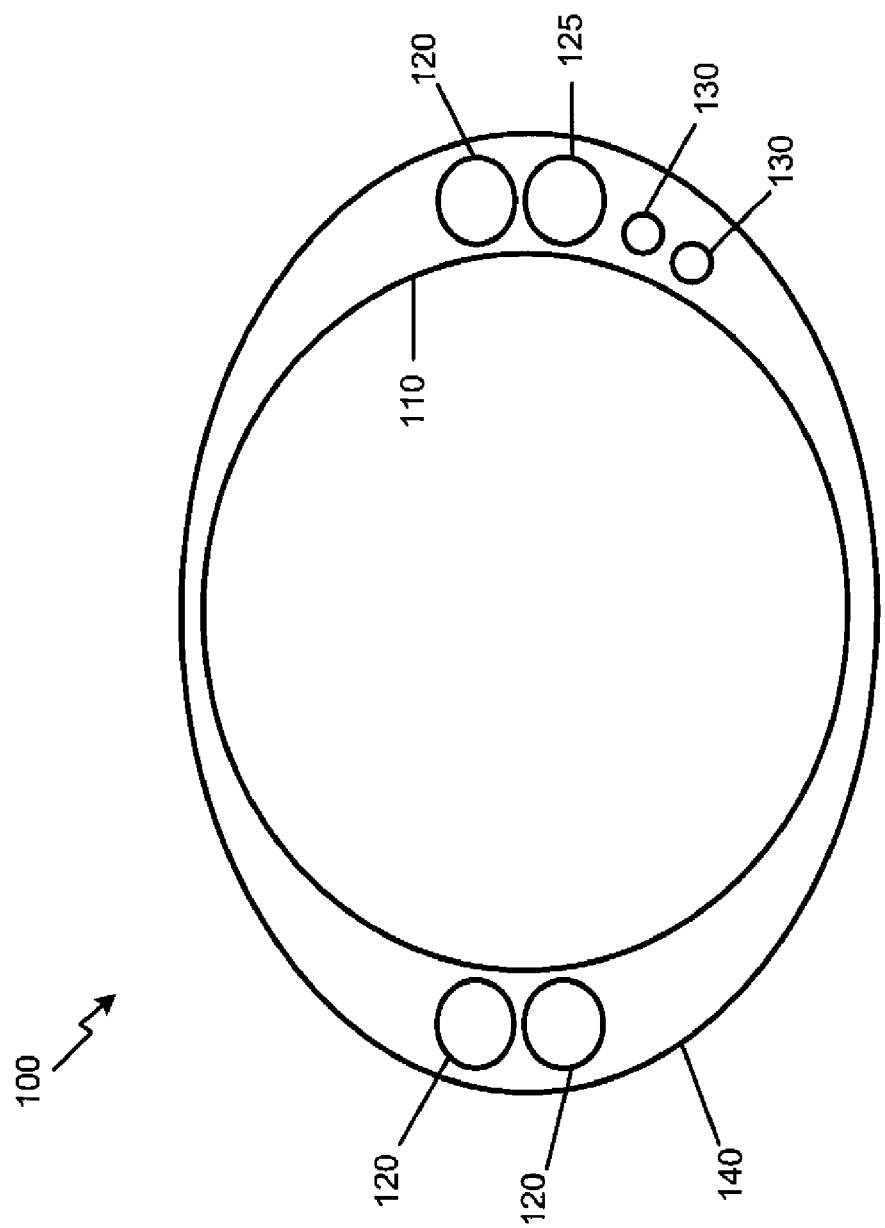

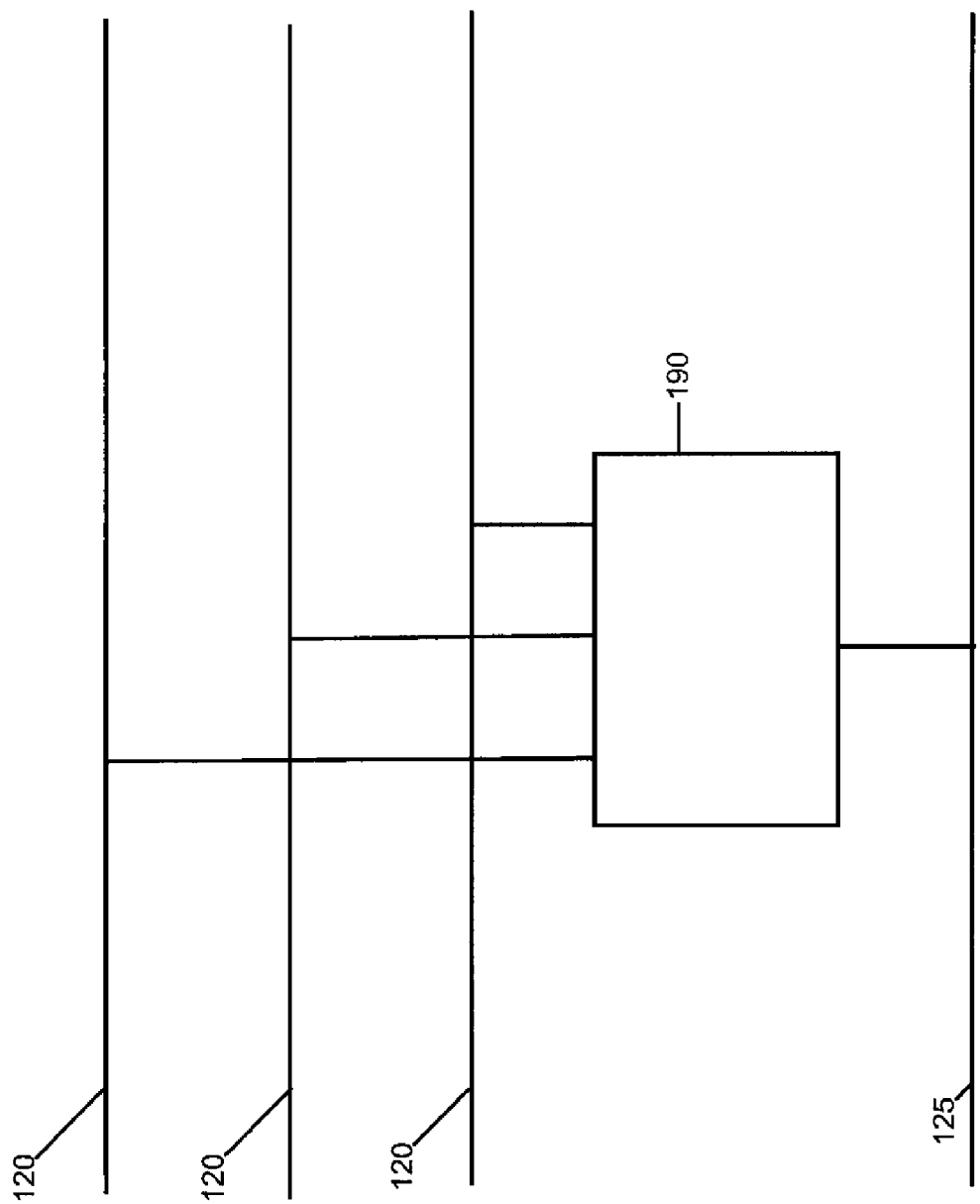

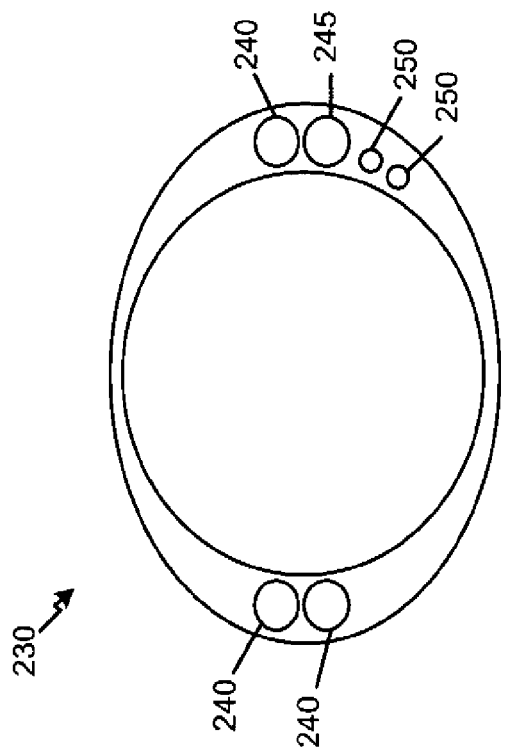
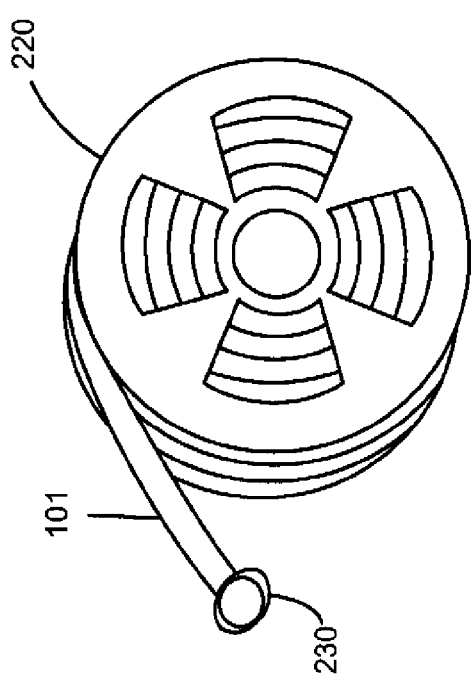
FIG. 2B
FIG. 2A

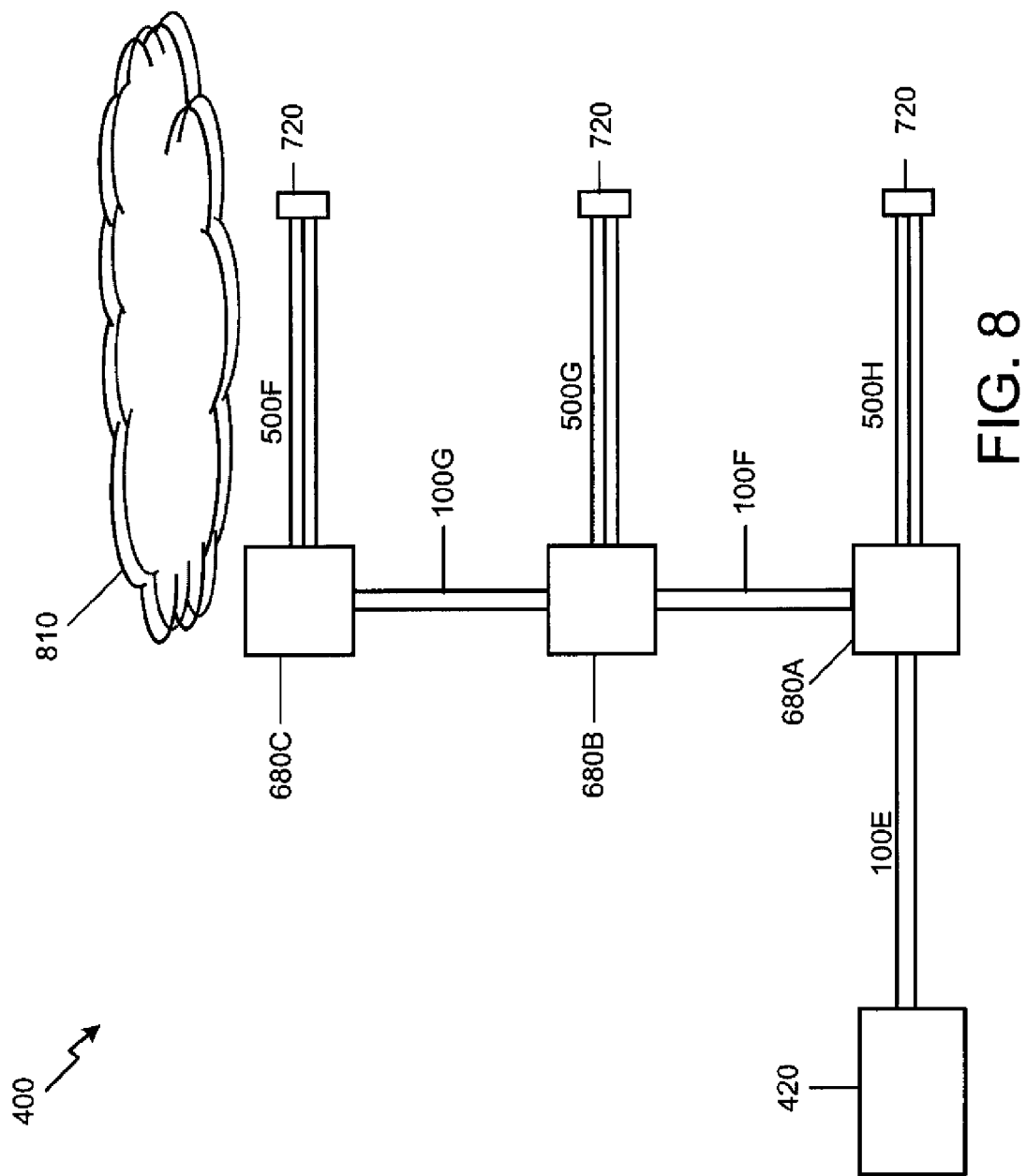

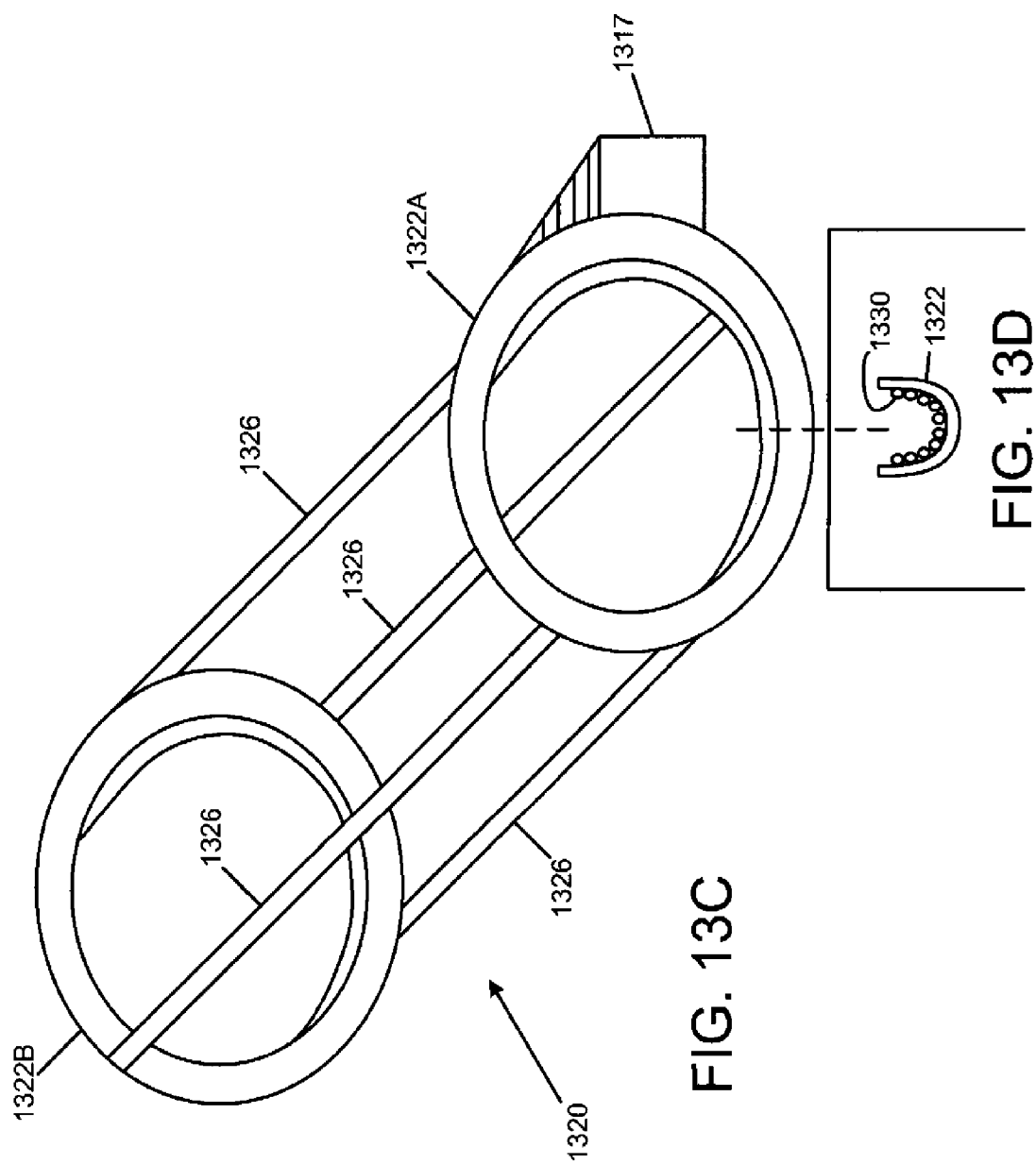

METHOD AND SYSTEM FOR FLUID TRANSMISSION ALONG SIGNIFICANT DISTANCES

CROSS-REFERENCE TO RELATED APPLICATION

This application claims priority to copending U.S. Provisional Application entitled, "Some New Means for Moving Water and Fighting Wildfires" having Ser. No. 60/994,080 filed Sep. 17, 2007 and US Provisional Application entitled "Further Inventions for Moving Water," having Ser. No. 61/125,690, filed Apr. 28, 2008 which is entirely incorporated herein by reference.

FIELD OF THE INVENTION

This disclosure is in the field of electrical and fluid distribution. More specifically, this disclosure describes the use of electrical wires associated with fluid conduit.

BACKGROUND OF THE INVENTION

One related prior art device includes a pair of wires attached to a fire hose. The device allows a fireman at the output end of a hose to ring a bell at the fire truck. The bell is used to send simple signals to the fireman in control of the pumps sending water into the hose.

Another prior art device is a grounding wire embedded in a fire hose. The device is used to protect a fireman who encounters a live electric wire while fighting a fire. The ground wire is utilized by bringing the dangerous voltage down to zero volts when the tip of the hose touches the dangerous voltage.

As a fluid is pumped through a hose or pipe, the fluid pressure drops as it gets farther from the pump, eventually becoming inconsequential. A mechanical characteristic of every hose or pipe is a maximum pressure beyond which the hose or pipe will burst. Therefore, increasing pump pressure to increase downstream fluid pressure eventually becomes detrimental to the hose or pump. A common technique to affect downstream pressure in a hose or pipe is to insert booster pumps at prescribed intervals downstream.

Firefighters sometimes connect multiple pumper trucks together to extend the distance of their hoses and to increase the effective fluid pressure, when a fire is a significant distance from a source of water. The use of multiple pumper trucks is called "relay pumping".

Relay pumping is operationally challenging. The pressure and flow at each pumper truck must be monitored and adjusted and this requires a dedicated firefighter at each pumper truck to be in radio communication with corresponding dedicated firefighters at adjacent pumper trucks. Several expensive fire trucks, which are often is short supply in various jurisdictions, must be dedicated to the relay operation and are thereby not available for other firefighting tasks.

The pumper trucks use their diesel or gasoline fuel to power the pumps. If the relay must be maintained for a long time, the pumper trucks will have to be supplied with more fuel. This requires even more manpower and vehicles to transport fuels to the fire trucks.

Wildfires are often located in areas that are far from roadways and large volumes of water. In many wildfires, relay pumping cannot be implemented because large fire trucks or pump trucks cannot be driven off road into difficult terrain. Special fire trucks that carry water tanks can go off road, but they can supply only a very limited quantity of water, inadequate for fighting most wildfires. Helicopters and planes are often used to drop water or flame retardant material on the fire because no other source of water is nearby.

For non-firefighting situations, there are alternative means available for transporting water. Irrigation canals require enormous amounts of earth moving, and they can suffer from excessive water loss due to evaporation. Pipelines, which do not have to be dug into the ground and they don't have evaporation problems, may be adopted. However, pipelines require spatially distributed pumping stations to keep their fluids moving over long distances. Where possible, a pumping station hooks into a local power grid to power the pumps. Where no local power grid is available, tanker trucks haul diesel fuel to supply the fuel for the pumping stations. With tanker trucks, there are high transportation costs and a risk of vehicle accidents and fuel spills.

Golf course type irrigation systems typically have a central water pumping station, which sends the water through buried pipes to the far reaches of the golf course. Because of pressure drops, booster pumps are often required at the farther ends of the pipes. Electric power is required at these booster pumps and the distribution of the electric power is often a separate system of buried wires, or wires on poles. Sometimes, a booster pump may not be needed, but electric power is needed to power a remote electric sprinkler controller which might be used to determine when the local terrain is dry and in need of water. One proposal has been to add a small turbine in the flow of the water at the far end. The electric power generated by the turbine is used to power the electric sprinkler controller. The turbine is used to preclude the need for constructing a separate electric power distribution system.

Most farmers use either electricity or diesel engines to supply power for their irrigation systems. A few use propane, natural gas or gasoline. Large irrigation systems can require more electric power than is available on single phase wiring systems. If three-phase power is not available on or near the farm, the cost to construct power lines may be prohibitive. If the farmer's fields are far from the source of electricity, then diesel powered booster pumps will be required. The cost and effort of delivering the diesel fuel to the diesel generators can be a burden. Alternatively, the farmer must construct electric power lines that run across his property to the locations of the electric booster pumps.

SUMMARY OF THE INVENTION

Embodiments of the present invention provide a system and method for conveying a fluid. Briefly described, in architecture, one embodiment of the system, among others, can be implemented as follows. The system contains a plurality of conduit segments and at least one electrically-powered pump. At least one conduit connector joins the conduit segments and the electrically-powered pumps, thereby mating at least one fluid path. A plurality of electric power wires are coupled with the conduit segments and connected to the electrically-powered electric pumps. At least one electrical connector, within said conduit connectors, mates corresponding electric power wires between the conduit segments. An electric power source electrically connected to the electrically-powered pump via the electric power wires.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is an illustration of a cross-section of a conduit, in accordance with a first exemplary embodiment of the present disclosure.

FIG. 1D is a schematic illustration of a ground fault interrupter for use with the conduit shown in FIG. 1A, in accordance with the first exemplary embodiment of the present disclosure.

FIG. 2A is a perspective illustration of the conduit of FIG. 1A on a storage reel, in accordance with the first exemplary embodiment of the present disclosure.

FIG. 2B is an illustration of a perspective view of a connector for the conduit of FIG. 1A, in accordance with the first exemplary embodiment of the present disclosure.

FIG. 8 is an illustration of a portion of a pipeline, in accordance with the first exemplary embodiment of the present disclosure.

FIG. 13C is an illustration of a perspective view of a reel support device for supporting the reels shown in FIG. 13A, in accordance with the first exemplary embodiment of the present disclosure.

FIG. 13D is an illustration of a side view of a detail of the reel support device of FIG. 13C, in accordance with the first exemplary embodiment of the present disclosure.

DETAILED DESCRIPTION

Figure 1B:
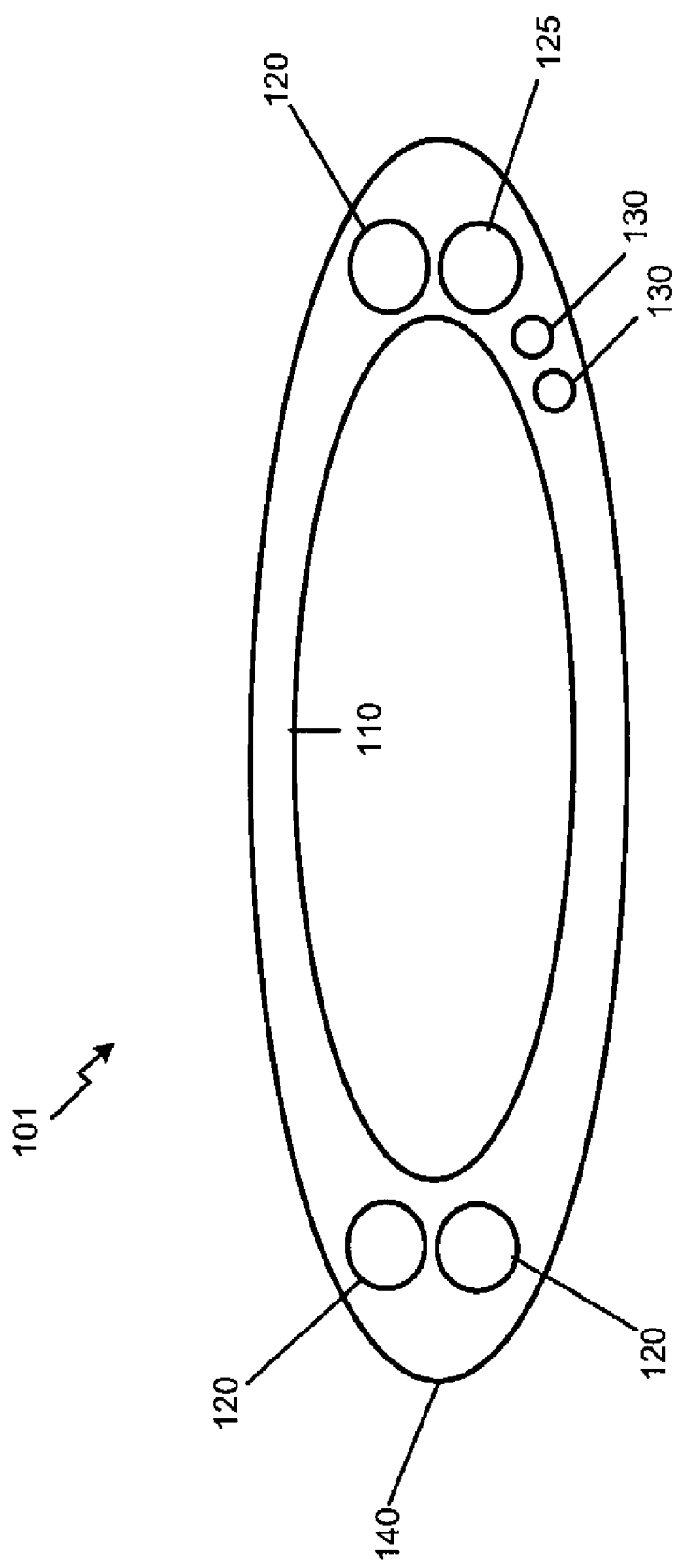
FIG. 1B is an illustration of a cross-section of a conduit, in accordance with a second exemplary embodiment of the conduit shown in FIG. 1A.

FIG. 1A is an illustration of a cross-section of a conduit, in accordance with a first exemplary embodiment of the present disclosure. FIG. 1A shows a cross section of a conduit, such as a fire hose or a rigid or semi-rigid pipe, combined with insulated electrical power wires 120, a ground wire 125 and communication wires 130, which will be referred to hereinafter as a wired fluid conduit (wfc) 100. The wired fluid conduit 100 can take the form of a wired fluid hose (wfh) 101, or a wired pipe (wp). The wired fluid hose and wired pipe are defined by the material and characteristics of the conduit. FIG. 1A shows a cross-section of the wired fluid hose 101 when it is full of water and in its expanded mode. FIG. 1A also shows a cross-section of the rigid or semi-rigid wired pipe. Three power wires 120 supply three-phase electrical power and a fourth wire supplies a ground wire 125, although single-phase power may be similarly provided. The communication wires 130 may be used to support an Ethernet type of data network and/or provide a low voltage system. The wires 120, 125, 130 may be located between an inner conduit surface 110 and an outer conduit surface 140.

FIG. 1B is an illustration of a cross-section of a conduit 100, in accordance with a second exemplary embodiment of the conduit shown in FIG. 1A. FIG. 1B shows a cross-section of a length of wired fluid hose (wfh) 101 when the wired fluid hose 101 is not under pressure and is able to assume a more flat shape suitable for storage.

Figure 1C:
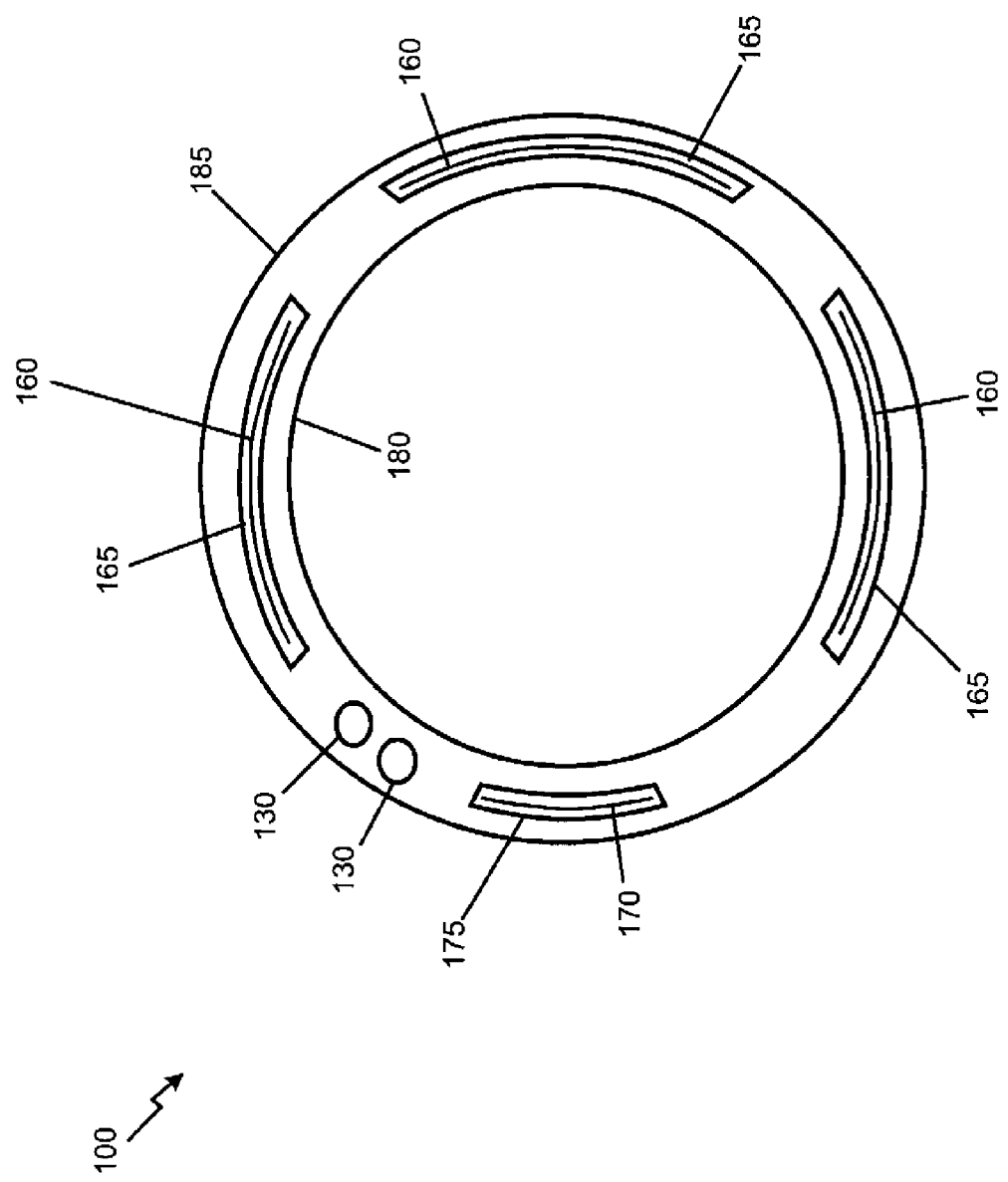
FIG. 1C is an illustration of a cross-section of a conduit, in accordance with a third exemplary embodiment of the conduit shown in FIG. 1A.

FIG. 1C is an illustration of a cross-section of a conduit, in accordance with a third exemplary embodiment of the conduit shown in FIG. 1A. FIG. 1C shows one of many possible alternate configurations of the wired fluid conduit 100. A maximum temperature tolerated by the insulation on the insulated electrical power wires limits the amount of current carried by insulated electrical power wires. In FIG. 1C, the power conductors 160 and ground conductor 170, are shown to be four separate flexible, flat stranded conductors that are covered with insulation 165, 175 and are located between an outer boundary 185 and an inner boundary 180 of the wired fluid conduit 100. The wired fluid conduit 100 is constructed such that the fluid flowing through the wired fluid conduit 100 will cool the insulated electrical power conductors 160. The cooling allows the insulated electrical power conductors 160 to carry more current without thermally damaging the insulation. The ground conductor 170 may be smaller than the three power conductors 160, as is common practice in power distribution, because less current flows through the ground conductor 170 in a three phase electrical system than through the other three power conductors 160.

In FIG. 1D is a schematic illustration of a ground fault interrupter for use with the conduit shown in FIG. 1A, in accordance with the first exemplary embodiment of the present disclosure. In FIG. 1D, a Ground Fault Interrupter (GFI) 190 may be connected to the power conductors 120 and to the ground conductor 125 to prevent accidental shocks from the voltage on the wires. The use of GFI's is well known in the art.

FIG. 2A is a perspective illustration of the conduit 101 of FIG. 1B on a storage reel 220, in accordance with the first exemplary embodiment of the present disclosure. FIG. 2A shows a length of wired fluid hose 101 on a storage reel 220. The storage reel 220 can be placed on an off road vehicle so that the wired fluid hose 101 can be deployed to fight a wildfire. A wfc connector 230 (as shown in FIG. 2B) is attached to an end of the wired fluid hose 101. The wfc connector 230 is kept fixed at the beginning of a wired fluid hose 101 run. A vehicle carries the reel 220 and the wired fluid hose 101 is deployed onto the ground from the storage reel 220. Trucks with long cargo areas can deploy lengths of wired pipe 102.

FIG. 2B is an illustration of an end view of a wfc connector 230 for the conduit 100 of FIG. 1A, in accordance with the first exemplary embodiment of the present disclosure. FIG. 2B shows an end view of the wfc connector 230 that attaches to both ends of a length of wired fluid conduit 100. The wfc connector 230 may include a plurality of power pins 240 that connect to the ends of the power wires 120, and a ground pin 245 that connects to the end of the ground wire 125. There is at least one communication pin 250 that attach to the communication wires 130 in the wired fluid conduit 100. The wfc connectors 230 may be designed to connect to the corresponding pins in a mating connector on an end of another length of wired fluid conduit 100. The communication wires 130 may be attached to a network connector 252 (shown in FIG. 4) that enables attachment of external networking capable devices to the network.

Figure 3B:
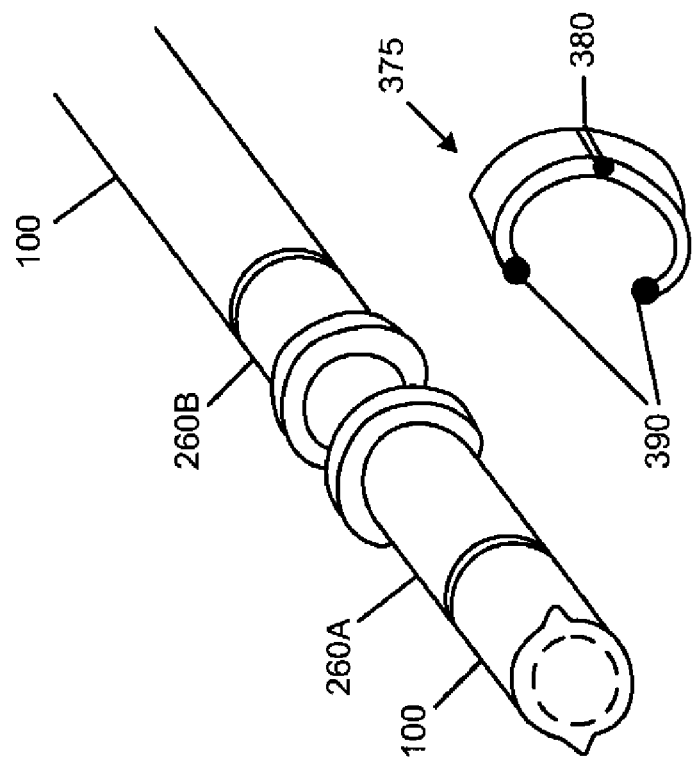
FIG. 3B is an illustration of an exploded view of the mated connectors of FIG. 3A, in accordance with the first exemplary embodiment of the present disclosure.
Figure 3A:
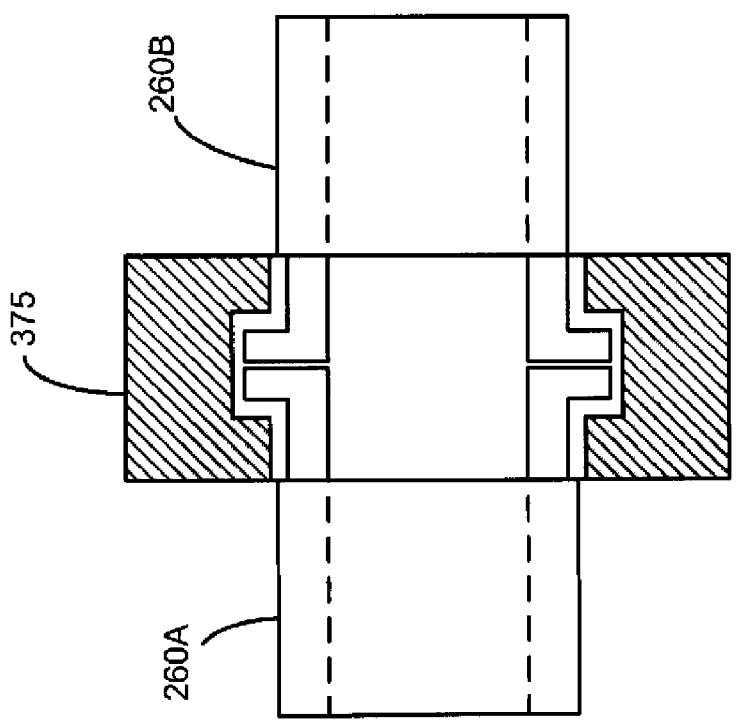
FIG. 3A is an illustration of a cross-sectional side view of two conduit connectors mated with a clamp, in accordance with the first exemplary embodiment of the present disclosure.

FIG. 3A is an illustration of a cross-sectional side view of two conduit connectors mated with a clamp, in accordance with the first exemplary embodiment of the present disclosure. FIG. 3A shows a side view of a first wfc connector 260A being urged to mate to a second wfc connector 260B via a wfc connector clamp 375.

FIG. 3B is an illustration of an exploded view of the mated connectors of FIG. 3A, in accordance with the first exemplary embodiment of the present disclosure. FIG. 3B shows a perspective view of the wfc connector 260A being urged to mate with the wfc connector 260B via the wfc connector clamp 375, as shown in FIG. 3A. Clamp 375 has a hinge 380 and a lock 390 which allows it to at least temporarily clamp together the two wfc connectors 260A, 260B. This connector technique is well known to those having ordinary skill in the art.

Figure 4:
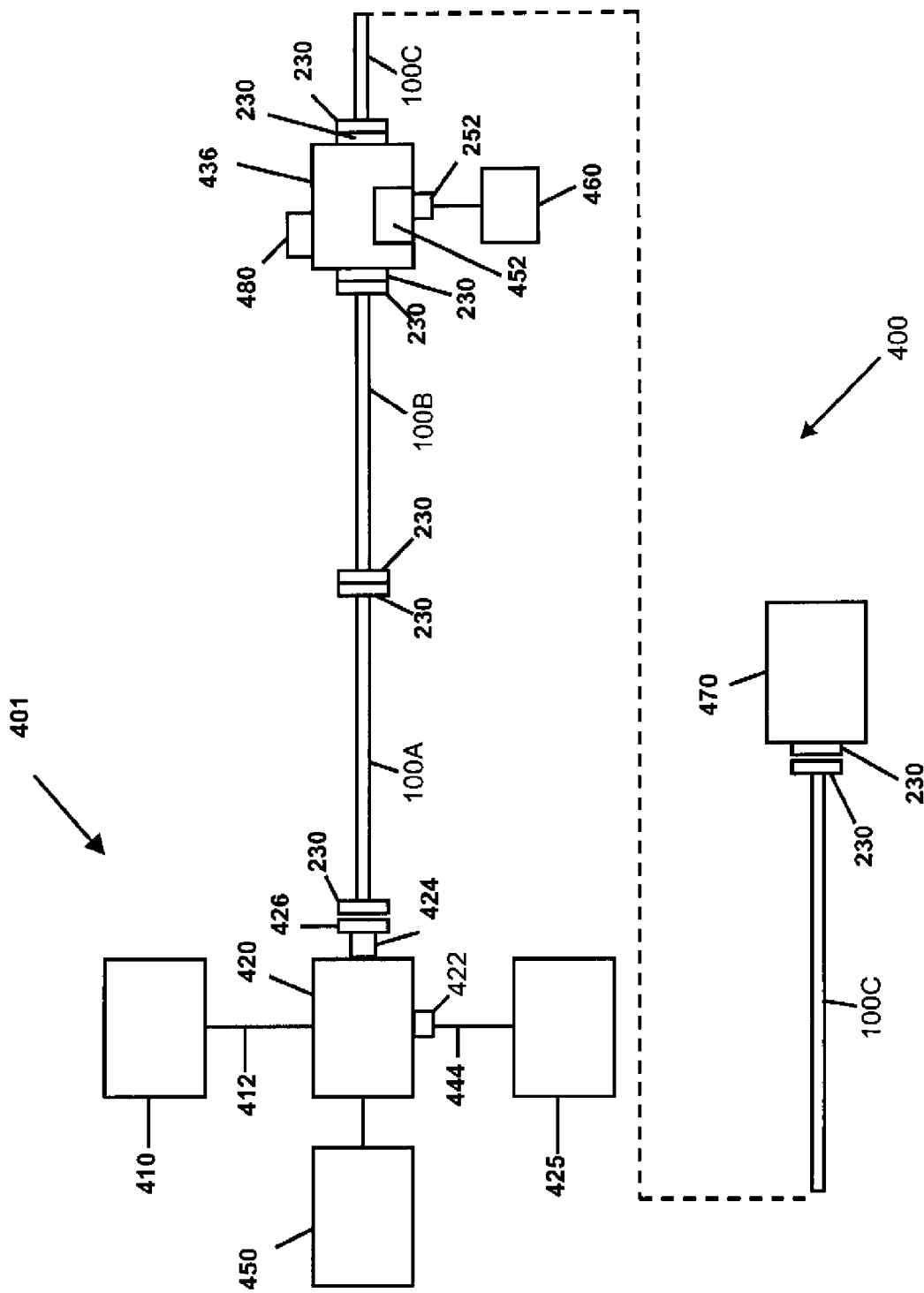
FIG. 4 is an illustration of a pipeline of the conduit shown in FIG. 1A, in accordance with the first exemplary embodiment of the present disclosure.

FIG. 4 is an illustration of a pipeline 400 of the conduit shown in FIG. 1A, in accordance with the first exemplary embodiment of the present disclosure. FIG. 4 shows a base unit 401. The base unit 401 includes an electric power source 410 that supplies electric power via a wire 412 to an electric base pump 420. The electric base pump 420 draws water from a water supply 425 and pumps the water into a first wired fire conduit 100A which further connects to a second wired fire conduit wired fluid conduit 100B via at least one wfc connector 230. The second wired fire conduit 100B further connects to an electric booster pump 436 via at least one wfc connector 230. The electric booster pump 436 may have a connector on each end that is compatible with a wfc connector 230. The electric booster pump 436 is further connected to a third wired fluid conduit 100C via at least one wfc connector 230. The electric booster pump 436 continues the power and communication paths between the two adjacent wired fluid conduits 100.

The electric booster pump 436 may contain a network device 452 that enables the data network to monitor and control the motors and apparatus in the electric booster pump 436. The vehicles that carry the reels 220 may carry the electric booster pumps 436.

An arrangement of one or more lengths of wired fluid conduit 100 that have a base unit 401 and one or more electric booster pumps 436 is hereinafter called a pipeline 400. The electric booster pump 436 may have an auxiliary power connector, auxcon 480, which allows electric power to be added to the pipeline 400 from additional power sources that are located at locations other than the beginning of the pipeline 400 where the base pump 420 is located. The technique of adding an additional power source within a generic power system is well known in the art.

The electric base pump 420 differs from the electric booster pump 436. Pump input 422 of electric base pump 420 may attach to a conventional fire hose 444, which draws water from water supply 425. No electrical wires are associated with the conventional fire hose 444. The input of base pump 420 has hose connections that are compatible with the industry standards that are well known in the industry.

A preinstalled pipeline 400 using mostly large diameter wired pipe 102 can be installed alongside roads and highways and can be pre-charged with water. This pipeline can be the water supply 425. The electric base pump 420 may further have a conventional data network connection to a network computer 450. The base pump 420 may further have industry standard electrical connections to the power source 410. The pump output 424 may have a connector 426 that is mateable with the wfc connector 230.

An Ethernet type of data network operates on the communication wires 130. In a pipeline 400 arrangement, there can be many electric booster pumps 436 that are connected to wired fluid conduits 100. The data network enables the network computer 450 to communicate with each electric booster pump 436 network device 452 that is located in each electric booster pump 436. The data network may be used to remotely measure and control each of the individual parameters of each electric booster pump 436 in the pipeline 400. The base pump 420 can replaced by a pumper fire truck, which can become the water supply 425 and the power source 410. The power source 410 can be a local power line, or a diesel or gasoline generator.

Global Positioning System (GPS) units 460 can be used by firefighters to determine the latitude, longitude and the elevation of each device (e.g., electric booster pump 436) to which they are proximate. Wherever there is a network connector 252, the location data from the GPS units 460 can be sent to the network computer 450 via the data network. The GPS location data is sent to the network computer 450 which may contain algorithms that determine where a electric booster pump 436 must be inserted to compensate for elevation differences and distances from the previous pump. The network computer 450 can also determine when an electric booster pump 436 must be added to compensate for pressure drops associated with the length of the arrangement. Each device in the network may have a unique network address so that the network computer 450 can automatically determine whether the most recent section of the pipeline 400 is a wired fluid hose 101 or a wired pipe 102. The wired fluid hose 101 and the wired pipe 102 have different pressure drops per unit of length and the network computer 450 must account for the difference before it can do its calculations for where the next electric booster pump 436 must be placed.

The data network allows for a multiplicity of parameters to be monitored by the network computer 450. A network device 452 may be attached to a network connector 252, on each of the wired fluid conduit 100. The temperature of the electric power wires 120 can be monitored, via the data network, to insure that the electric power wires 120 don't overheat their insulation 165.

A test box 470 has an attached connector which mates with the wfc connector 230. The test box 470 is mated to the wfc connector 230 at the right end of third wired fluid conduit 100C, as shown in FIG. 4. The test box 470 measures the resistance of the electric power wires 120 from end to end of the pipeline 400 in order to confirm that all of the electric power wires 120 and connections are functioning properly. The test box 470 also communicates with the network computer 450 in order to insure that the communication wires 130 and connections are working properly.

Firemen can use the data network in the pipeline 400 to send and receive voice and data with firemen at other locations. This feature is useful in locations where radio communication is impaired.

Figure 5A:
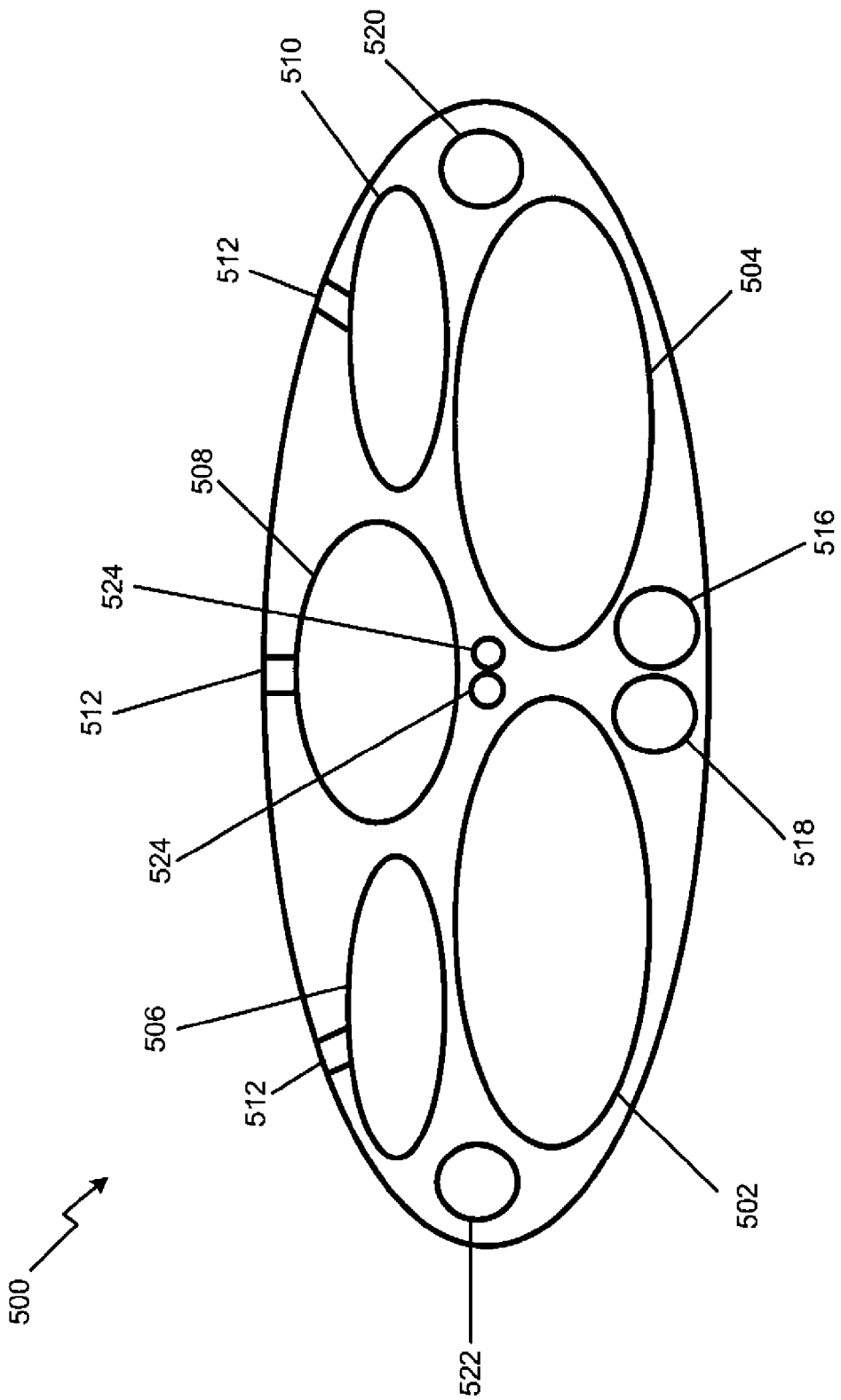
FIG. 5A is an illustration of a cross-section of a conduit, in accordance with a fourth exemplary embodiment of the conduit shown in FIG. 1A.

FIG. 5A is an illustration of a cross-section of a conduit, in accordance with a fourth exemplary embodiment of the conduit shown in FIG. 1A. FIG. 5A shows a cross section of a wired spray conduit (wsc) 500 whose function is to spray water into the air to fight fires. The wired spray conduit 500 can take the form of a flexible wired spray hose (wsh) or it can take the form of a rigid or semi rigid wired spray pipe (wsp). The two bottom wired spray conduit sections 502 and 504 transport the water and they create a wide and flat profile that urges the wired spray conduit 500 to lie flat when placed on the ground. Electric power wires 516, 518, 520, and a ground wire 522, and communication wires 524 are shown inside the wired spray conduit 500 in FIG. 5A.

Spray nozzles 512 may be associated with a left hose section 506, a center hose section 508, and a right hose section 510 of the wired spray conduit 500. The left hose section 506 aims a spray in a leftward direction, relative to the view in FIG. 5A. The center hose section 508 aims a spray in a vertical direction. The right hose section 510 aims a spray in a rightward direction. The spray nozzles 512 are placed a predetermined distance apart along a length of the wired spray conduit 500 and their orifice diameter may change to compensate for pressure drops along the hose. A nozzle far from a pump may need a large orifice in order to spray the desired volume of water. The different spray directions allow the firemen to select a desired spray direction to compensate for ground slope and wind conditions. When the wired spray conduit 500 are deployed on a steep slope, they can be staked into the ground to prevent slippage or twisting.

Figure 5B:
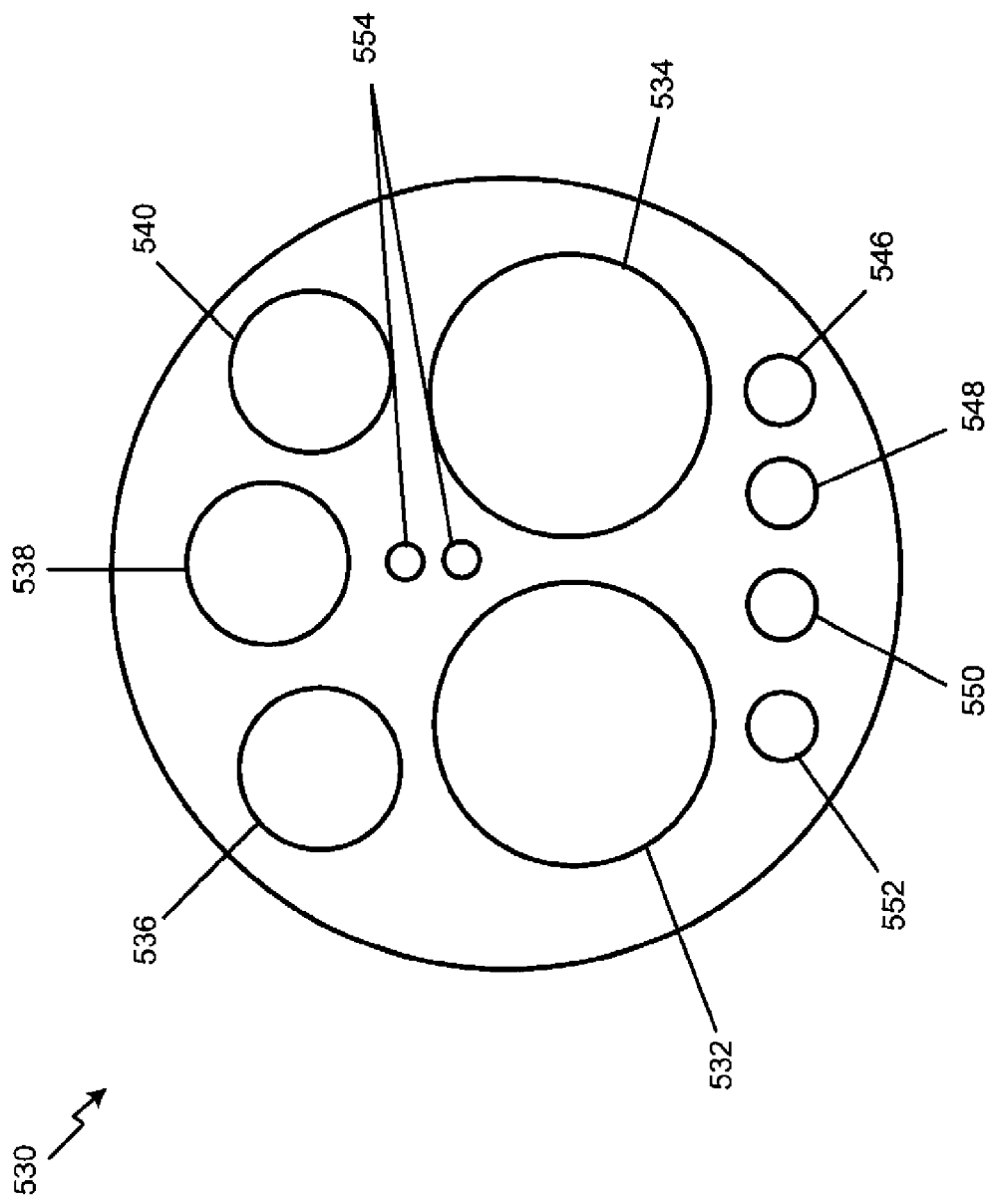
FIG. 5B is an illustration of a perspective view of a connector for the conduit of FIG. 5A, in accordance with the fourth exemplary embodiment of the conduit shown in FIG. 1A.

FIG. 5B is an illustration of an end view of a wsc connector 530 for the conduit 500 of FIG. 5A, in accordance with the fourth exemplary embodiment of the conduit shown in FIG. 1A. FIG. 5B shows an end view of a wsc connector 530 placed on each end of a length of wired spray conduit 500 (shown in FIG. 5A). The wsc connector 530 has a left section orifice 536 that connects to the left hose section 506. The wsc connector 530 has a center section orifice 538 connected to the center hose section 508 and a right section orifice 540 connected to the right hose section 510. Ground pin 552 connects to a wsc ground wire 522. A first power pin 550 connects to the first electric power wire 518, a second power pin 548 connects to the second electric power wire 516, and a third power pin 546 connects to the third electric power wire 520. Communication pins 554 connect to the communication wires 524. Two lengths of wired spray conduit 500 can be connected together via a clamp similar to clamp 375 in FIG. 3B allowing spray conduit sections 502, 504 to mate with two connector ports 532, 534. The corresponding power and communication wires 516, 518, 520, 522, 524 in each length of the wired spray conduit 500 are connected together by the wsc connectors 530.

Figure 6A:
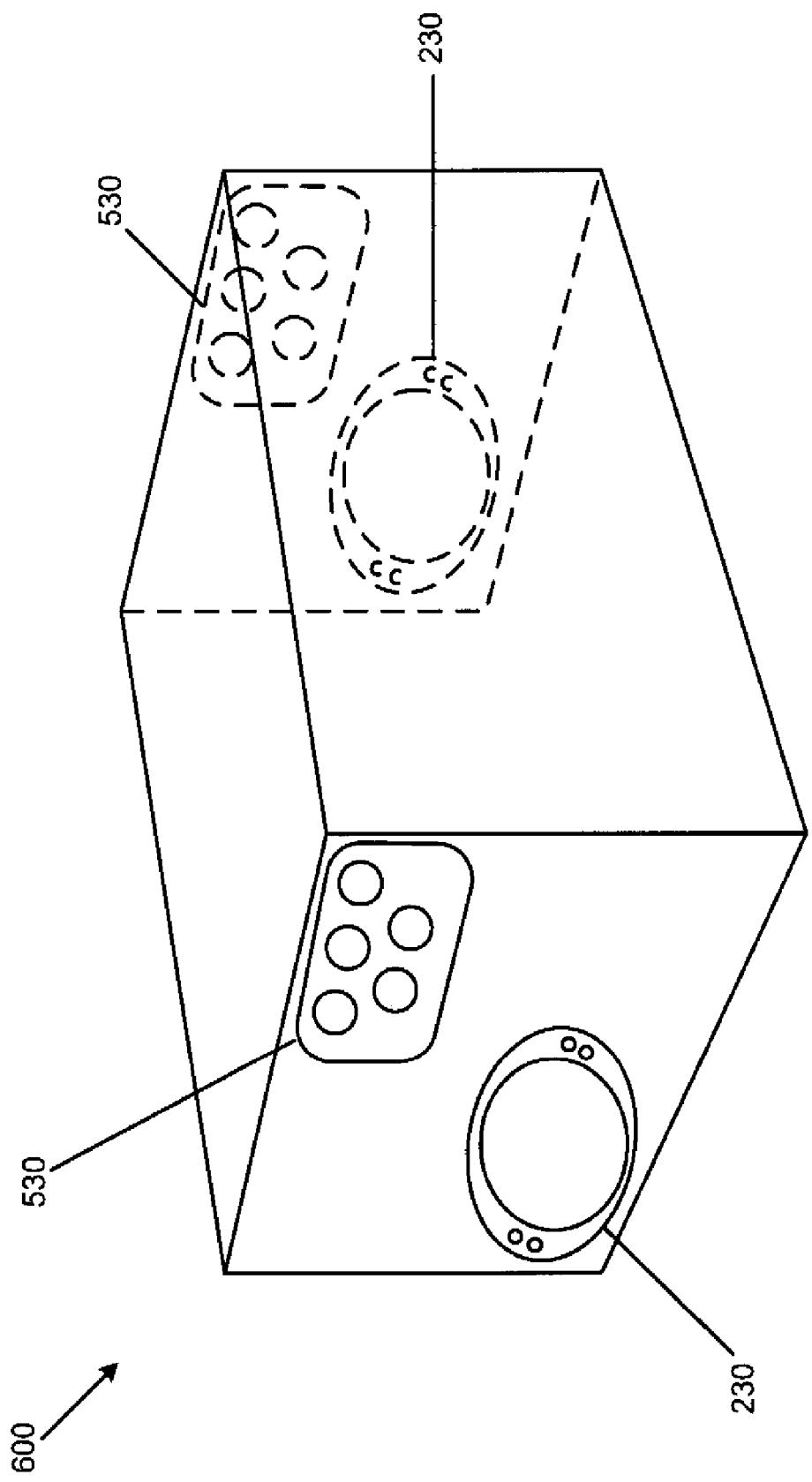
FIG. 6A is an illustration of a perspective view of an adapter for connection to the conduit shown in FIG. 1A, FIG. 1B, FIG. 1C, and FIG. 5A, in accordance with the first exemplary embodiment of the present disclosure.

FIG. 6A is an illustration of a perspective view of an adapter 600 for connection to the various conduits shown in FIG. 1A, FIG. 1B, FIG. 1C, and FIG. 5A, in accordance with the first exemplary embodiment of the present disclosure. The wired fluid conduit 100 and the wired spraying conduit 500 may be compatible with the wfc connector 230 on multiple sides of the adapter 600. Adapter 600 may also have connectors compatible with the wsc connector 530 on multiple sides.

Figure 6B:
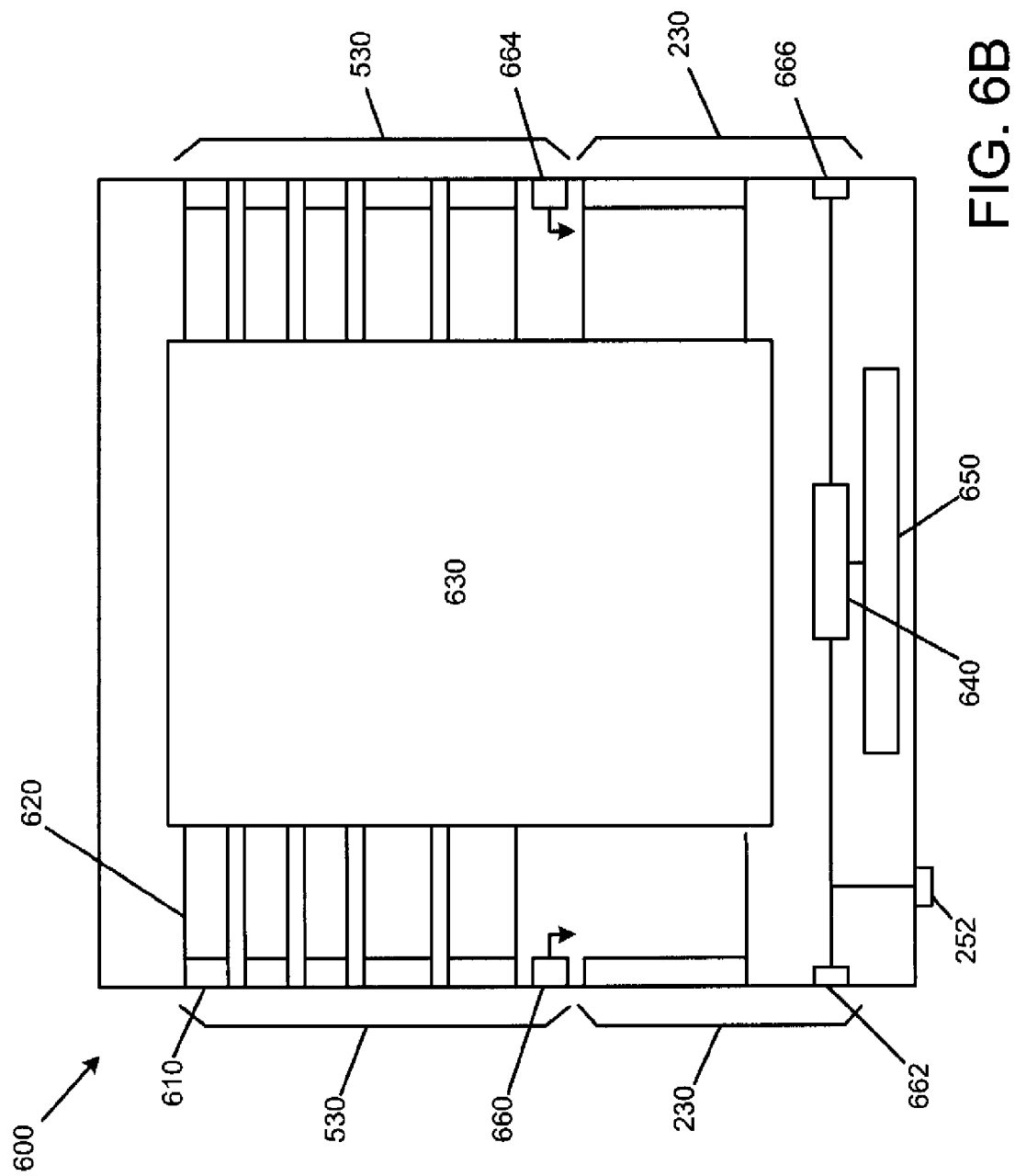
FIG. 6B is an illustration of a cross-sectional side view of the adapter shown in FIG. 6A, in accordance with the first exemplary embodiment of the present disclosure.

FIG. 6B is an illustration of a cross-sectional side view of the adapter 600 shown in FIG. 6A, in accordance with the first exemplary embodiment of the present disclosure. FIG. 6B shows a side view of the adapter 600. On each side is a connector compatible with the wfc connector 230 and the wsc connector 530. A valve 620 is shown inserted between a water path 610 in the wsc connector 530 and the container 630. The valve 620 enables or disables water flow between the wsc connector 530 and container 630. The valve 620 is controlled by an adapter controller 650 that receives commands from a network device 640 that is connected to the data network by the communication wires 252 524 which are located in wfc connector 230 and wsc connector 530. All of the water paths on the wfc connector 230 and the wsc connector 530 connect to valves that enable or disable water flow to the container 630. The adapter controller 650 may control all of the valves.

The electrical and communication wires 660, 662, 664, 666 are connected to the adapter controller 650, the network device 640, the network connector 252 and to the corresponding connections in the other connectors 230, 530 such that the power and communication wires 120, 130, 160, 170, 516, 518, 520, 522, 524 are passed between different segments of wired fluid conduit 100 and wired spraying conduit 500. The valves 620 in the adapter 600 allow for a plurality of interconnections between wired fluid conduits 100 and wired spraying conduits 500. The valves 620 allow water to flow in either direction, so that any conduit connector 230, 530 can be an input or an output for water flow.

Figure 6C:
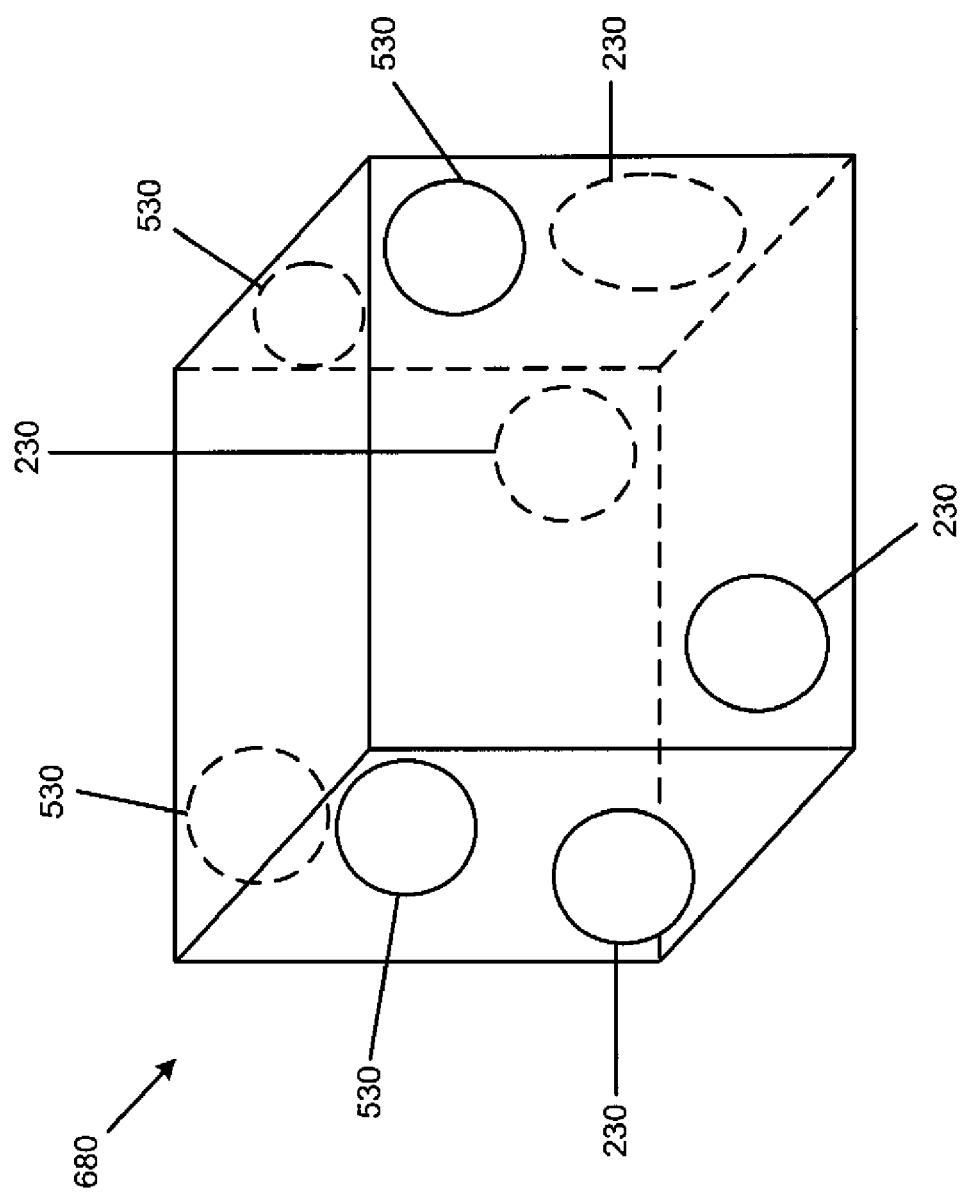
FIG. 6C is an illustration of a perspective view of another adapter for connection to the conduit shown in FIG. 1A, FIG. 1B, FIG. 1C, and FIG. 5A, in accordance with the first exemplary embodiment of the present disclosure.

FIG. 6C is an illustration of a perspective view of another adapter for connection to the conduits 100, 500 shown in FIG. 1A, FIG. 1B, FIG. 1C, and FIG. 5A, in accordance with the first exemplary embodiment of the present disclosure. FIG. 6C shows a perspective view of a multiport adapter 680 that is similar to adapter 600 and has additional connectors with the same functionality. The multiport adapter 680 allow for additional topological arrangement of wired fluid conduit 100 as will be described in following sections.

Figure 7A:
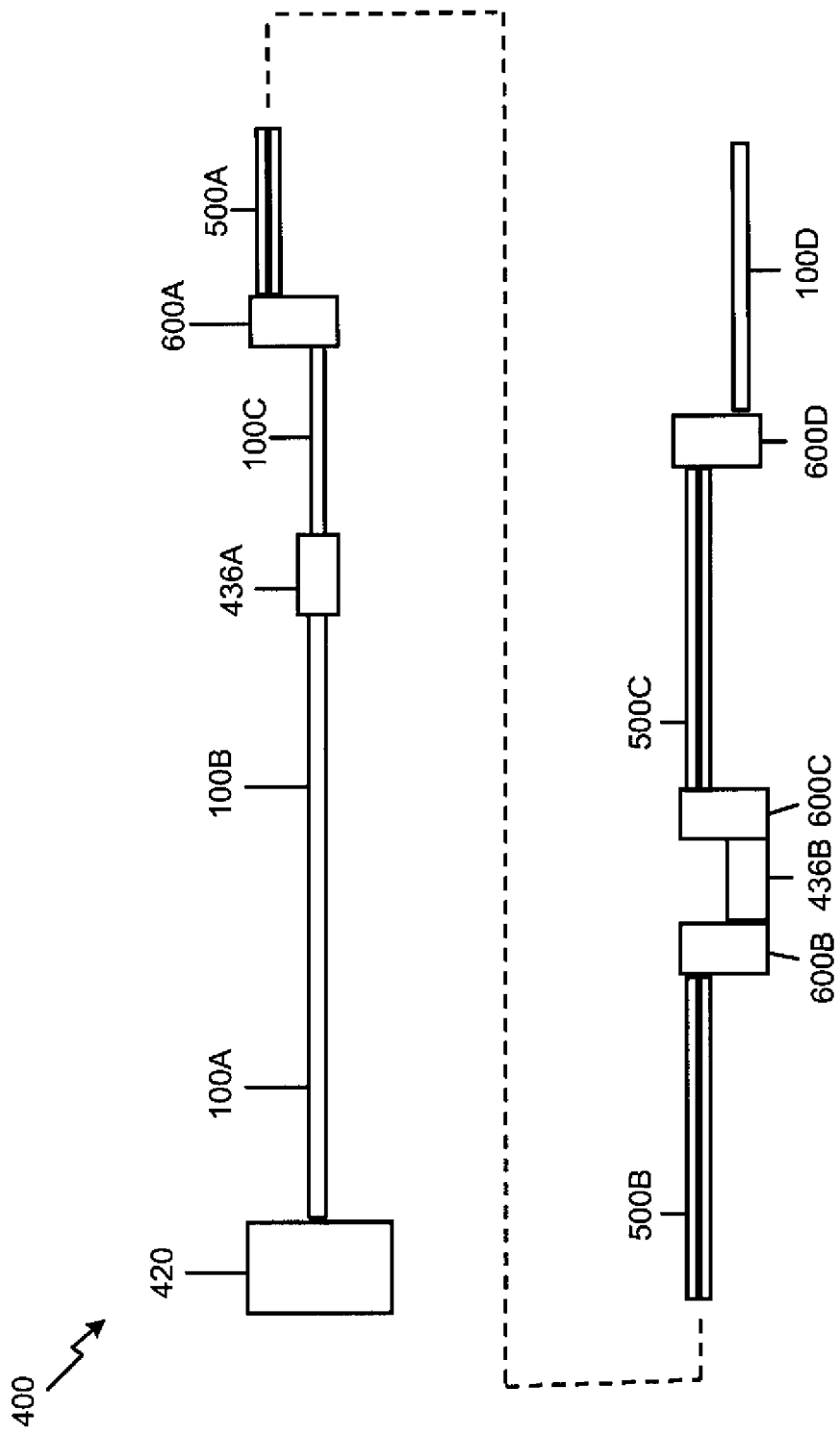
FIG. 7A is an illustration of a pipeline, in accordance with the first exemplary embodiment of the present disclosure.

FIG. 7A is an illustration of a pipeline 400, in accordance with the first exemplary embodiment of the present disclosure. FIG. 7A shows an example of interconnecting different lengths of wired fluid conduit 100 and wired spraying conduit 500 using adapters 600. Base pump 420 supplies water under pressure to a first wired fluid conduit 100A which supplies water to a second wired fluid conduit 100B which delivers the water to a first electric booster pump 436A. First electric booster pump 436A boosts the pressure and sends the water into a third wired fluid conduit 100C which delivers the water to the connector on a first adapter 600A. The water exits the first adapter 600A from a connector compatible with the wsc connector 530, and enters the first wired spraying conduit 500A. The first wired spraying conduit 500A delivers water to the second wired spraying conduit 500B which delivers water to a second adapter 600B. The second adapter 600B delivers the water to a second electric booster pump 436B which boosts the pressure and further delivers the water to a third adapter 600C. The third adapter 600C delivers water to the third wired spraying conduit 500C which delivers the water to a fourth adapter 600D. The fourth adapter 600D which further delivers the water to a fourth wired fluid conduit 100D.

Figure 7B:
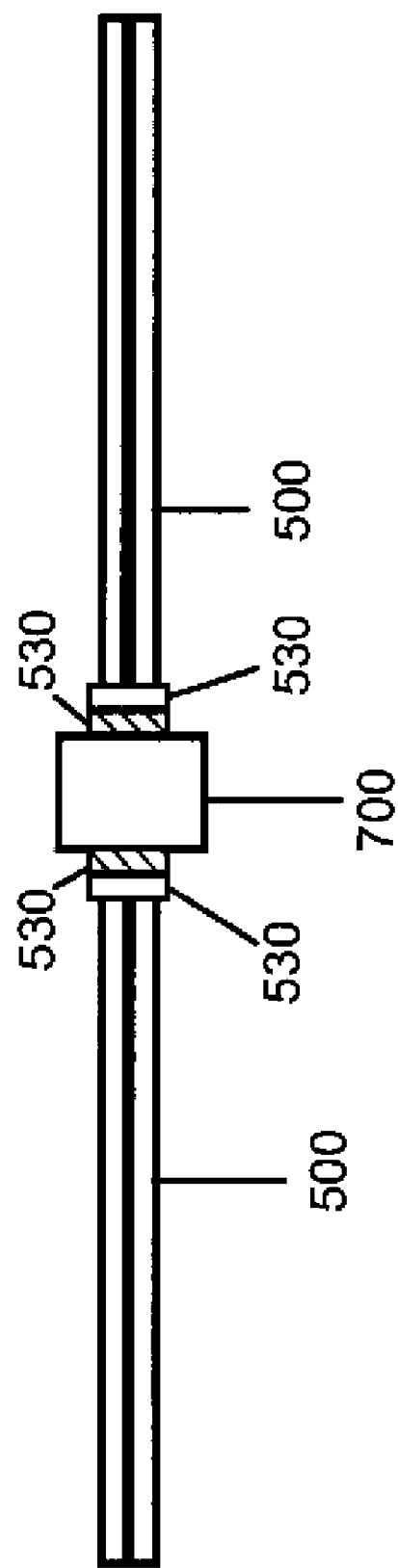
FIG. 7B is an illustration of an exploded view of an interconnection of the conduit of FIG. 5A and a pump, in accordance with the first exemplary embodiment of the present disclosure.

FIG. 7B is an illustration of an exploded view of an interconnection of the conduit 500 of FIG. 5A and a pump 700, in accordance with the first exemplary embodiment of the present disclosure. FIG. 7B shows a wsc pump 700 that contains a wsc connector 530 on each end that allows connection to the wsc 530 connector on the wsc 500. The wsc pump 700 allows lengths of a wired spraying conduit 500 to be connected together without the use of the adapters 600.

Figure 7C:
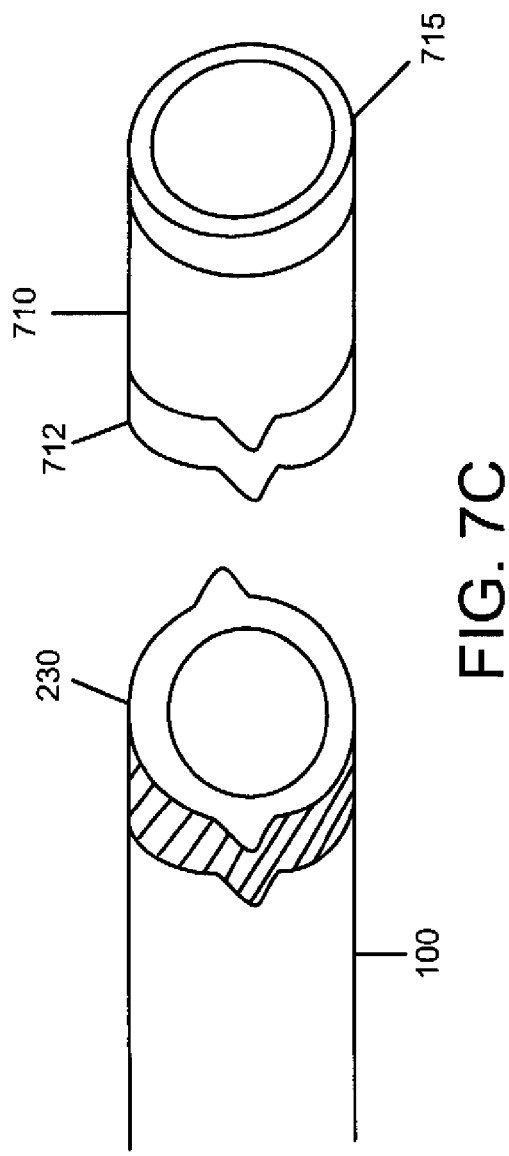
FIG. 7C is an illustration of a perspective view of a fire hose adapter, in accordance with the first exemplary embodiment of the present disclosure.

FIG. 7C is an illustration of a perspective view of a fire hose adapter 710, in accordance with the first exemplary embodiment of the present disclosure. A hose adapter 710 allows fire hoses to connect to a first end connector 715. A second end connector 712 mates with the wfc connector 230 on an end of the wired fluid conduit 100 and is held in contact by the clamp 375.

Figure 7D:
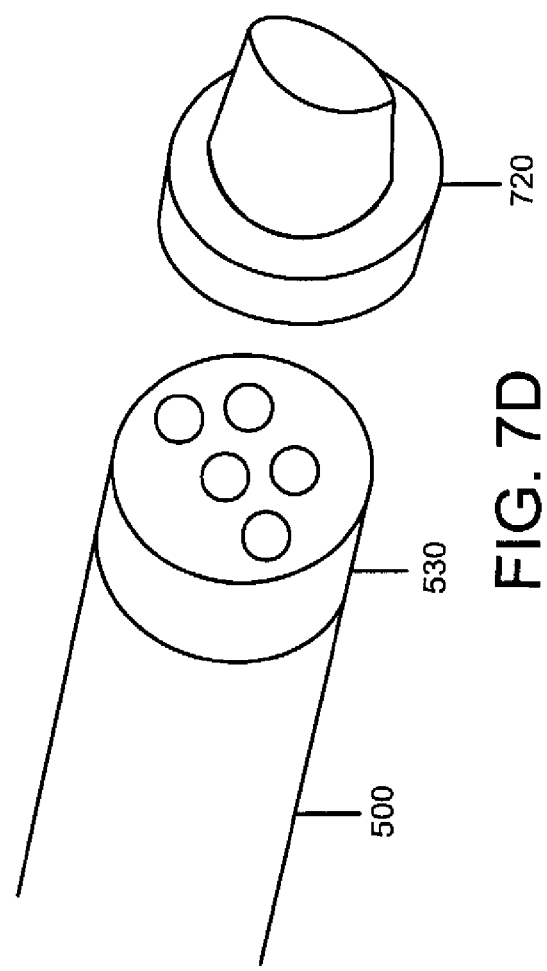
FIG. 7D is an illustration of a perspective view of a stop flow, in accordance with the first exemplary embodiment of the present disclosure.

FIG. 7D is an illustration of a perspective view of a flow stop 720, in accordance with the first exemplary embodiment of the present disclosure. A wsc flow stop 720 connected to the wired spraying conduit 500 via a clamp similar to wfc connector clamp 375. In order to improve the pressure in the spray nozzles 512 at the end of a wired spraying conduit 500 pipeline, the water must not be allowed to exit the end of the pipeline. The wsc flow stop 720 prevents water from exiting the wsc connector 530.

FIG. 8 is an illustration of a portion of a pipeline 400, in accordance with the first exemplary embodiment of the present disclosure. FIG. 8 shows a topology that can fight a fire by remote control and adapt as the fire conditions change. Base pump 420 pumps water into a fifth wired fluid conduit WOE, which supplies water to a first adapter 680A, which further supplies water to a sixth wired fluid conduit 100F and a seventh wired spraying conduit 500H. The sixth wired fluid conduit 100F supplies water to a second adapter 6808 which further supplies water to an eighth wired fluid conduit 100G and an eighth wired spraying conduit 500G. The eighth wired fluid conduit 100G supplies water to a third adapter 680C which further supplies water to the sixth wired spraying conduit 500F. The sixth, seventh and eighth wired spraying conduit 500F, 500G, 500H are attached to the wsc flow stops 720.

FIG. 8 shows a fire 810 which is near the sixth wired spraying conduit 500F. The firemen can use the data network to direct the water from base pump 420 to flow only to the sixth wired spraying conduit 500F. If the fire passes the sixth wired spraying conduit 500F, the firemen can direct the water only to the eighth wired spraying conduit 500G, or the seventh wired spraying conduit 500H. The ability to spray water on a fire using a wired spraying conduit 500, and the ability to have remote control of water flow, will lower the risk of death and injury for firemen.

Figure 9:
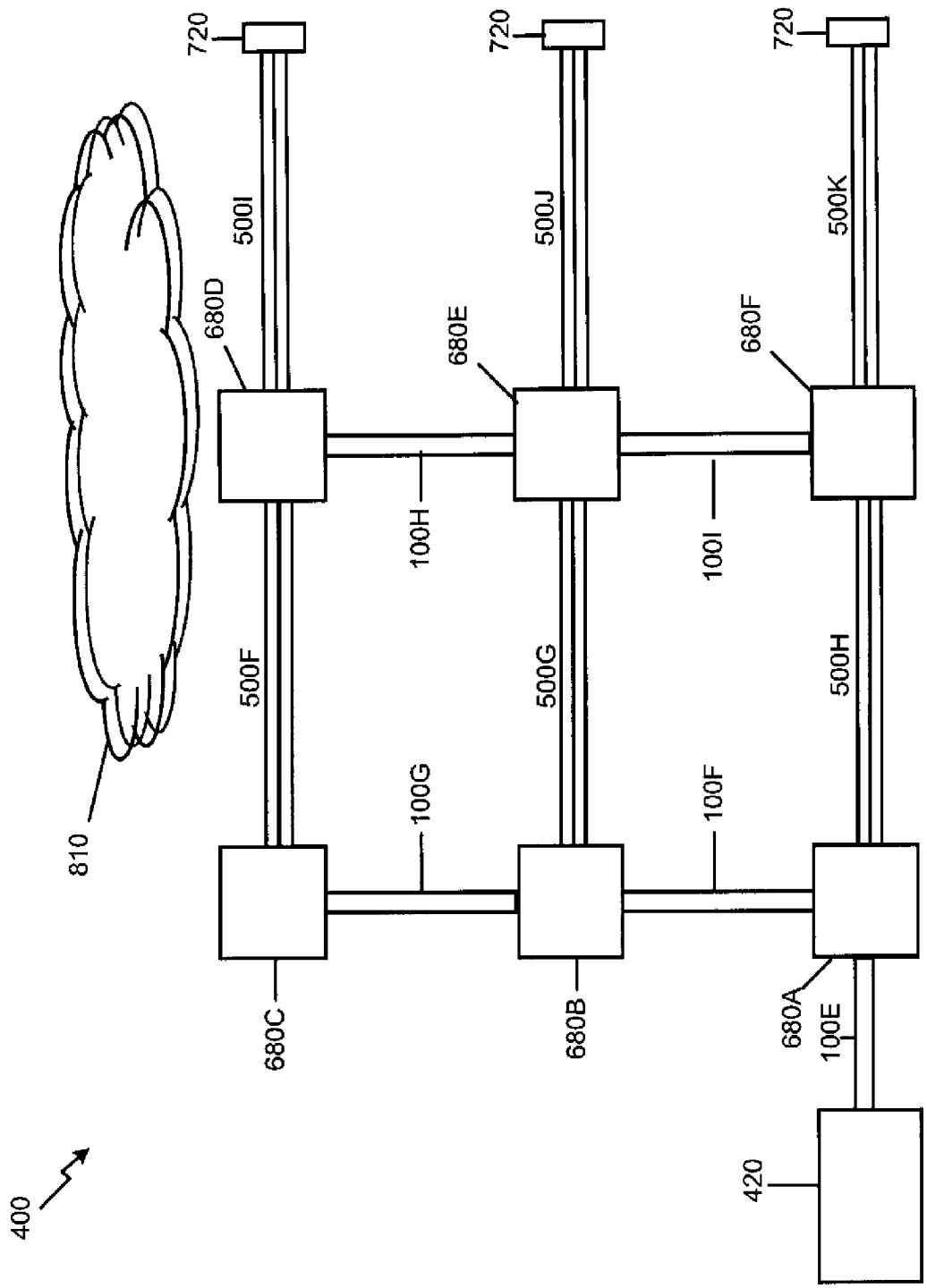
FIG. 9 is an illustration of a portion of a pipeline, in accordance with the first exemplary embodiment of the present disclosure.

FIG. 9 is an illustration of a portion of a pipeline 400, in accordance with the first exemplary embodiment of the present disclosure. Base pump 420 pumps water into a fifth wired fluid conduit 100E, which supplies water to a first adapter 680A, which further supplies water to a sixth wired fluid conduit 100F and a seventh wired spraying conduit 500H. The sixth wired fluid conduit 100F supplies water to a second adapter 680B which further supplies water to an eighth wired fluid conduit 100G and an eighth wired spraying conduit 500G. The eighth wired fluid conduit 100G supplies water to a third adapter 680C which further supplies water to the sixth wired spraying conduit 500F.

FIG. 9 shows a fourth, fifth, and sixth supplemental adapters 680D, 680E, 680F replacing wsc flow stops 720 (as compared to FIG. 8). A ninth, tenth, and eleventh wired spraying conduit 500I, 500J, 500K are added to the supplemental adapters 680D, 680E, 680F. A ninth and tenth wired fluid conduit 100 interconnect the supplemental adapters 680D, 680E, 680F in order to give redundant paths for the water to flow if there is a failure in any of the first, second and third adapters 680A, 680B, 680C. The wsc flow stops 720 are placed at the end of the ninth, tenth, and eleventh wired spraying conduit 500I, 500J, 500K.

Figure 10:
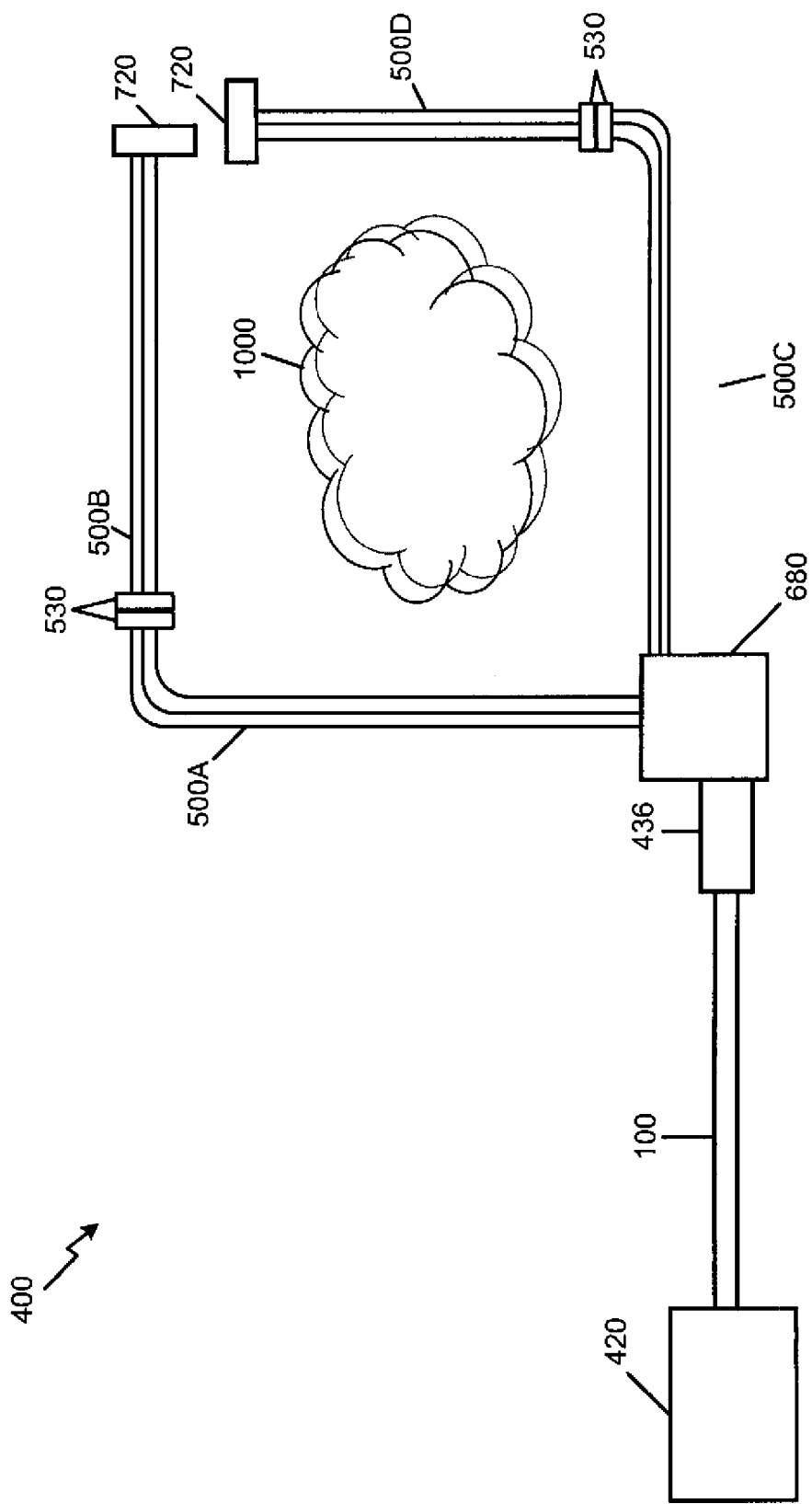
FIG. 10 is an illustration of a portion of a pipeline, in accordance with the first exemplary embodiment of the present disclosure.

FIG. 10 is an illustration of a portion of a pipeline 400, in accordance with the first exemplary embodiment of the present disclosure. FIG. 10 shows a system of water spray conduit 500 that have been deployed to surround an area of a fire 1000. The base pump 420 urges water into the wired fluid conduit 100 which delivers the water to electric booster pump 436 which further delivers water to adapter 680. Adapter 680 supplies water to wired spraying conduit 500A which further supplies water to wired spraying conduit 500B. Adapter 680 supplies water to wired spraying conduit 500C which further supplies water to wired spraying conduit 500D. On the ends of wired spraying conduit 500B, 500D are wsc flows stops 720. The wired spraying conduit 500 can be used to surround and protect a cluster of homes from a wildfire rather than surround the fire 1000. If there are swimming pools in the home cluster, the pools might be used as a water source. A community without swimming pools might decide to invest in a large portable pool to store an emergency water supply.

Controlled burns are fires that are intentionally set by firemen to clear combustible material that collects on the ground. Firemen also use controlled burns to consume combustible material before a larger wildfire arrives. Sometimes the controlled burns get out of control and become large fires. The topology of FIG. 10 can help control the controlled burns by surrounding them with pipes and hoses that can spray water on any nearby fires.

Figure 11:
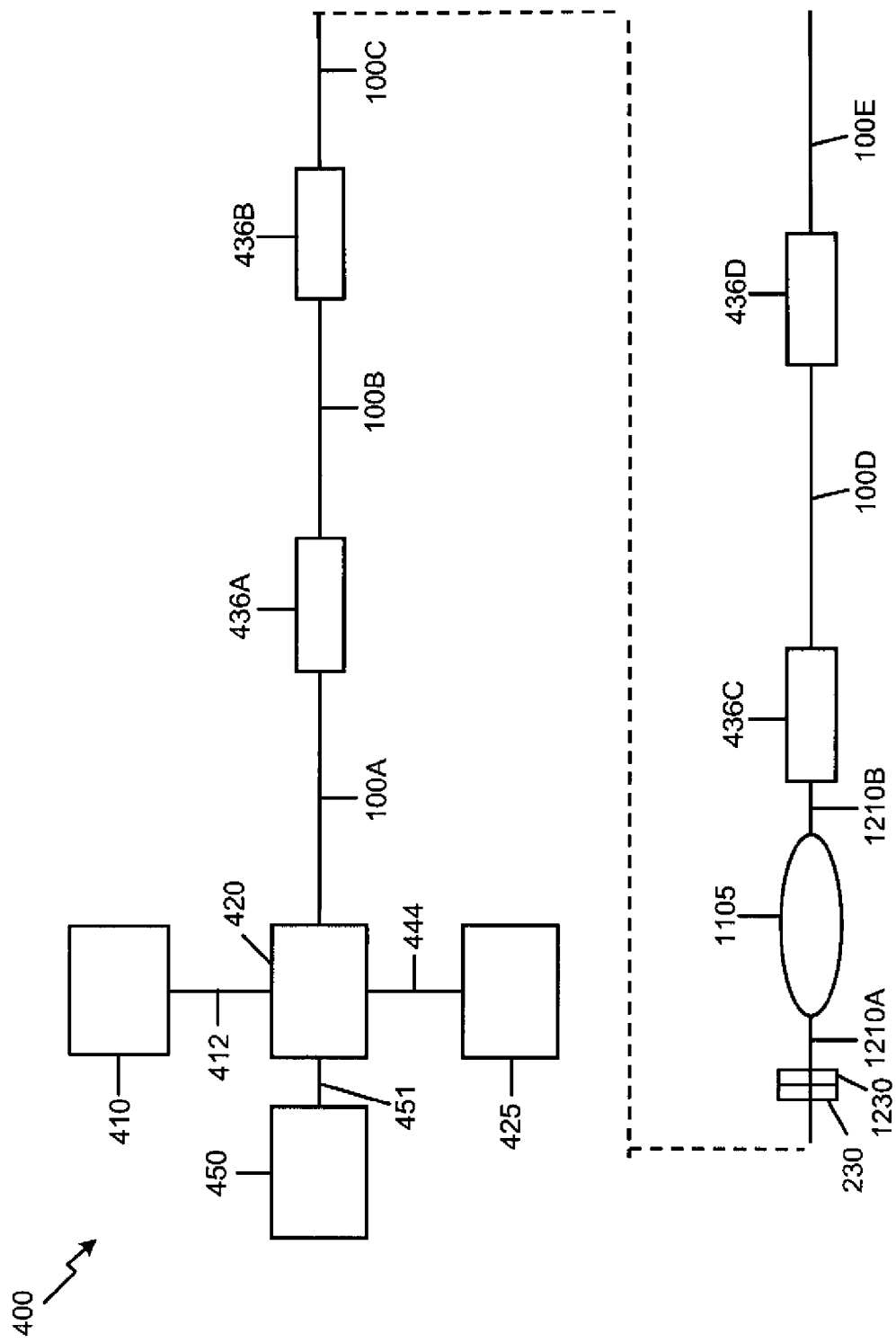
FIG. 11 is an illustration of a portion of a pipeline, in accordance with the first exemplary embodiment of the present disclosure.

FIG. 11 is an illustration of a portion of a pipeline 400, in accordance with the first exemplary embodiment of the present disclosure. FIG. 11 shows base pump 420 taking water from water supply 425 via a conduit 444. The base pump 420 gets its electric power from an electric power source 410 through conductors 412 and the base pump 420 pumps water into a first wired fluid conduit 100A, which further delivers the water to a first electric booster pump 436A. The first electric booster pump 436A urges water into a second wired fluid conduit 100B which further delivers the water to a second electric booster pump 436B, which urges water into a third wired fluid conduit 100C which delivers the water into a portable pool 1105. A portable pool 1105 is commonly used by firemen to store water, and is typically a plastic swimming pool type liner that is supported by a foldable metallic structure.

In FIG. 11, a third electric booster pump 436C draws water out of the portable pool 1105 and urges the water into a fourth wired fluid conduit 100D which further carries the water to a fourth electric booster pump 436D which further pumps the water into a fifth wired fluid conduit 100E.

In FIG. 11, the portable pool supplies a technique for pumping water a longer distance than would normally be possible. The electric current for the base pump 420 comes directly through the conductors 412 from the power source 410 and therefore the electric current for the base pump 420 does not travel through any power wires in a wired fluid conduit 100 or a wired spraying conduit 500.

If all of the electric booster pumps 436A, 436B, 436C, 436D are turned on at once, the electric current traveling in the electric power wires 120 (shown in FIG. 1A) in the first wired fluid conduit 100A will be the total of the currents required by each of the group of electronic booster pumps 436A, 436B, 436C, 436D. If only the first and second electric booster pumps 436A, 436B are turned on, the water will be delivered only into the portable pool 1105. There will be no current flowing to power the third and fourth electric booster pumps 436C, 436D and the current in the first wired fluid conduit 100A will be diminished accordingly. If only the third and fourth electric booster pumps 436C, 436D are turned on, the water in the portable pool 1105 will be delivered to the fifth wired fluid conduit 100E. There will be no current flowing to power the first and second electric booster pumps 436A, 436B.

Only half of the water may be delivered to the fourth wired fluid conduit 100D in a given period of time, but the water can be delivered approximately twice as far for a predetermined maximum current capacity of the power wires in the wired fluid conduit 100. More portable pools 1105 can be added to a pipeline in order to extend the maximum length, but the amount of water delivered per period of time will be reduced each time a portable pool 1105 is added. Another way to increase the current handling capabilities of the pipeline 400 is to have different gauge wires in different sections. The first wired fluid conduit 100A might have the thickest power wires because it must handle the current for all of the electric booster pumps 436. The second wired fluid conduit 100B might have less thick wires because it does not have to supply the same current as the first wired fluid conduit 100A, but must supply more current than the third and fourth wired fluid conduit 100C, 100D. The third and fourth wired fluid conduit 100C, 100D might have the least thick wires because fewer electric booster pumps 436 require current flow through them.

Figure 12:
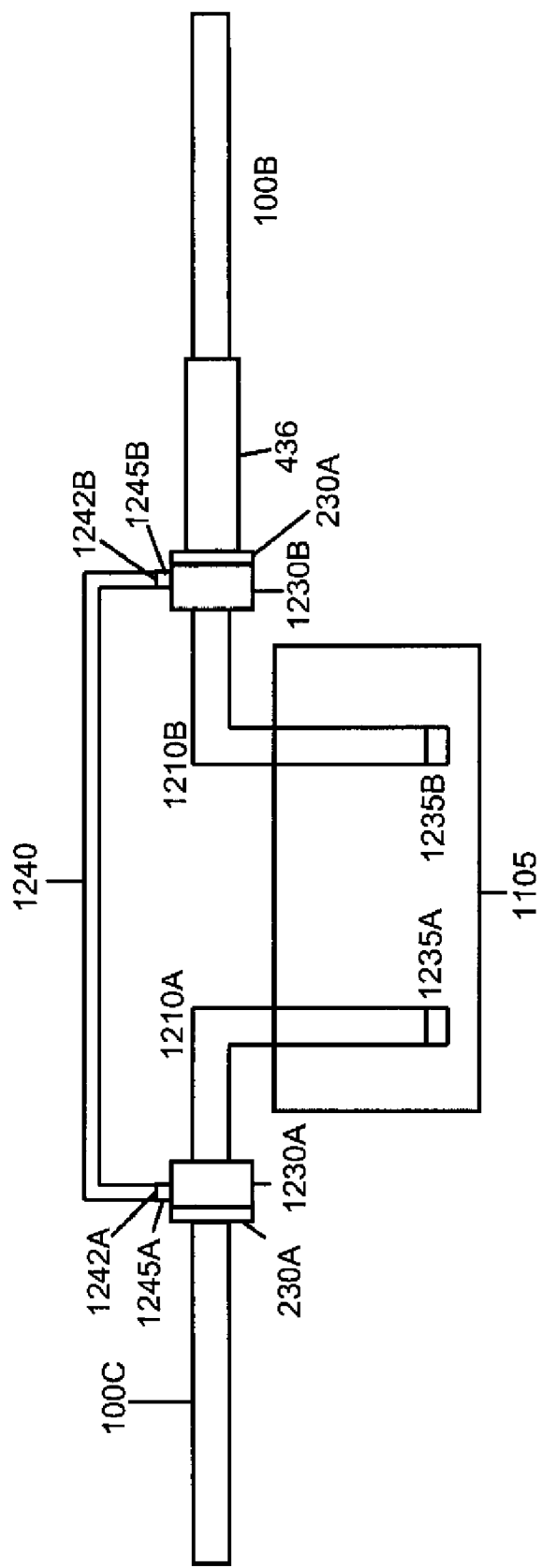
FIG. 12 is an illustration of a perspective view of a detail of the pipeline of FIG. 11, in accordance with the first exemplary embodiment of the present disclosure.

FIG. 12 is an illustration of a side view of a detail of the pipeline 400 of FIG. 11, in accordance with the first exemplary embodiment of the present disclosure. FIG. 12 shows a technique for separating the water flow path from the electric power and communication path when a portable pool 1105 is added to the topology. The third wired fluid conduit 100C delivers water to a pool hose 1210A. A first wfc connector 230A mates with a pool hose connector 1230A. The water passes through the pool hose 1210A (also shown in FIG. 11) and exits from the hose end 1235A into the portable pool 1105.

The electric power wires 120, the ground wire 125, and communication wires 130 (shown in FIG. 1A) must not come into contact with the water in the portable pool 1105. The wires 120, 125, 130 exit the first pool hose connector 1230A via a first pool connector 1245A and mates with wire bundle 1240 via a first bundle end connector 1242A.

A second pool hose 1210B is similar to the first pool hose 1210A, but is used to withdraw water from the portable pool 1105. The pool hoses 1210A, 1210B may be reinforced such that they can tolerate suction as well as pressure. Water is drawn into the second pool hose 1210B at a second hose end 1235B and travels through a second pool hose connector 1230B into electric booster pump 436 which further pumps the water into a second wired fluid conduit 100B.

The wire bundle 1240 attaches via a second end connector 1242B to a second pool connector 1245B which further connects the power, ground, and communication pins on the second pool hose connector 1230B which further mates with a compatible connector 230A on electric booster pump 436. The wire bundle 1240 enables the power wire 120, the ground wire 125, and communication wires 130 (shown in FIG. 1A) to bypass the portable pool 1105.

If an electric booster pump 436 fails, the failure is detected by the network computer 450, and the network computer 450 can command the adjacent electric booster pumps 436 to incrementally increase their pressure to compensate for the failure. The communication wires 130 may support TV cameras, microphones, motion detectors, and thermometers along the pipeline 400. The multiple sections of the wired spraying conduit 500 improve system reliability because the spray function from a failed section can be replace by the spray function of another section. If, because of some system failure, the data network cannot control a particular device, a manual (local) method of controlling the particular device may be desirable. The electric power wires 120 may be made from an electrical conducting material that has superior strength in order to diminish a possibility of breakage of the electric power wires 120.

The proposed wildfire fighting system requires that electric power be sent to pumps 436 placed at intervals along a significant length of wired fluid conduit 100. FIG. 1 shows an exemplary arrangement of associating the electric power wires 120 with the wired fluid conduit 100. An electric power wire 120 might be a normal bundle of copper strands, or it might be a flat woven conductive fabric which is embedded into the walls of the wired fluid conduit 100. The electric power wires 120 might be concentric layers in the walls of the wired fluid conduit 100.

Another possibility is to have the electric power wires 120 attached by wire-ties to the outside of the wired fluid conduit 100. This possibility would allow fire companies to keep their current stock of conduit and to simply attach bundles of electric power wires 120 to selected conduit. Another possibility is to keep the electric power wires 120 separate from the conduit. The electric power wires 120 and conduit can be put on different reels on the back of a vehicle that would be deployed concurrently as the vehicle drives along the terrain.

Figure 13A:
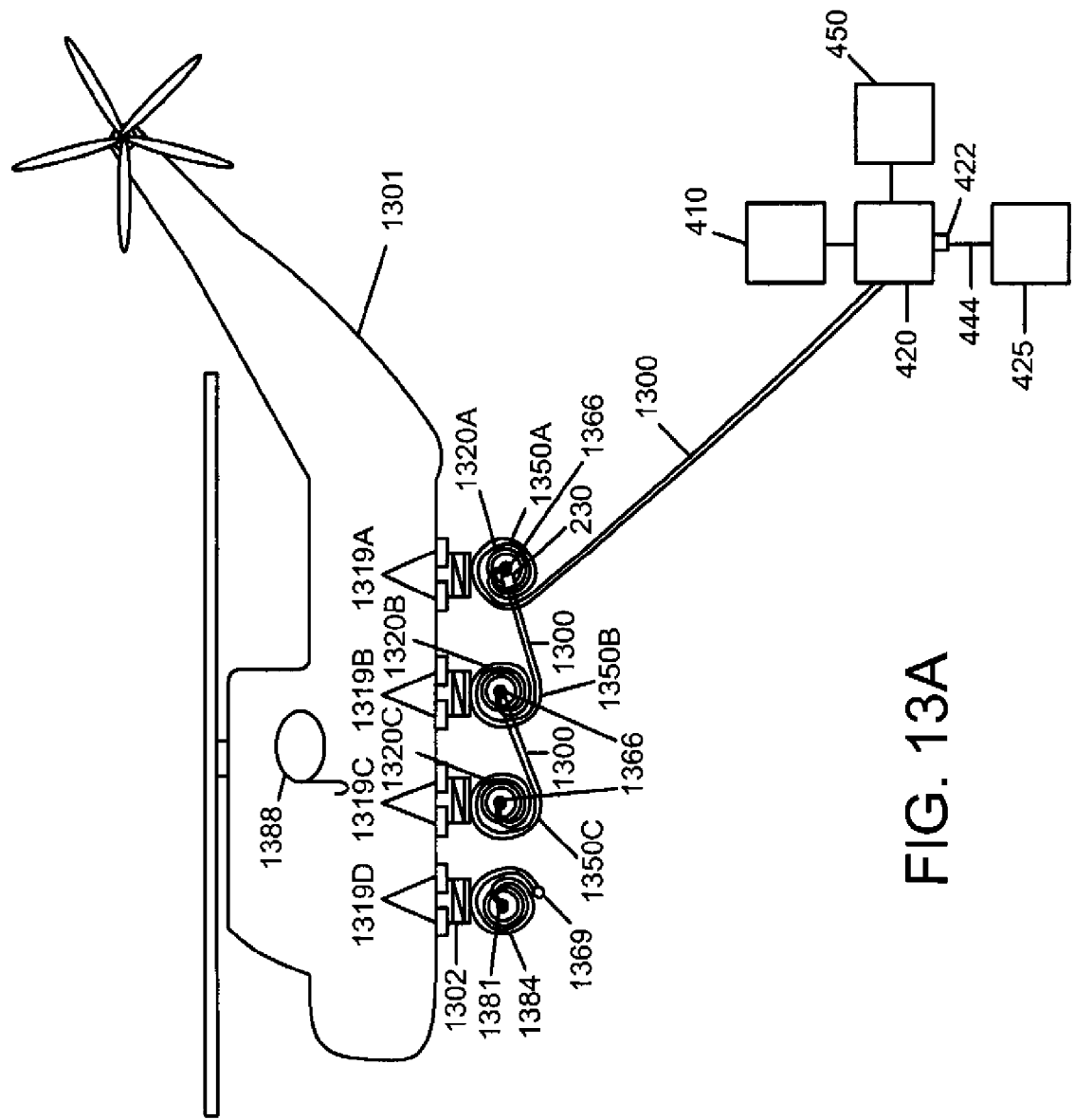
FIG. 13A is an illustration of a side view of an aerial vehicle carrying conduit, in accordance with the first exemplary embodiment of the present disclosure.

FIG. 13A is an illustration of a side view of an aerial vehicle (e.g., a helicopter 1301) carrying reels of conduit, in accordance with the first exemplary embodiment of the present disclosure. FIG. 13A shows a plurality of aerial reels 1350A, 1350B, 1350C which store interconnected lengths of aerial hose or helicopter hose (hh) 1300. The reels are attached to the helicopter 1301 via reel support brackets 1302. The helicopter hose 1300 is similar in function to the wired fluid hose 101, but is designed to be delivered to a fire site by an aerial vehicle such as a helicopter 1301. The helicopter hose 1300 has wfc connectors 230.

A base pump 420, on the ground, supplies water, electric power, and communication signals to the helicopter hose 1300. The helicopter hose 1300 may be wrapped around and stored on a first aerial reel 1350A. At the center of the first aerial reel 1350A is a reinforced hose 1366. The reinforced hose 1366 connects via wfc connectors 230 to another length of helicopter hose 1300 stored on a second aerial reel 1350B which is similarly connected to another length of helicopter hose 1300 on a third aerial reel 1350C.

A reel of conventional hose 1384 with a conventional nozzle 1381 is also attached to the helicopter 1301. The non-nozzle end of the conventional hose 1384 has a connector that is physically compatible with the wfc connector 230 and that allows water transmission, but does not receive the electric power wires 120 or the communication wires 130 from the helicopter hose 1300. The firemen use the conventional hose 1384 to fight the fires. A winch 1388 is attached to the helicopter 1301 and is capable of lowering and raising the aerial reels 1350A, 1350B, 1350C and the reel of the conventional hose 1384.

Figure 13B:
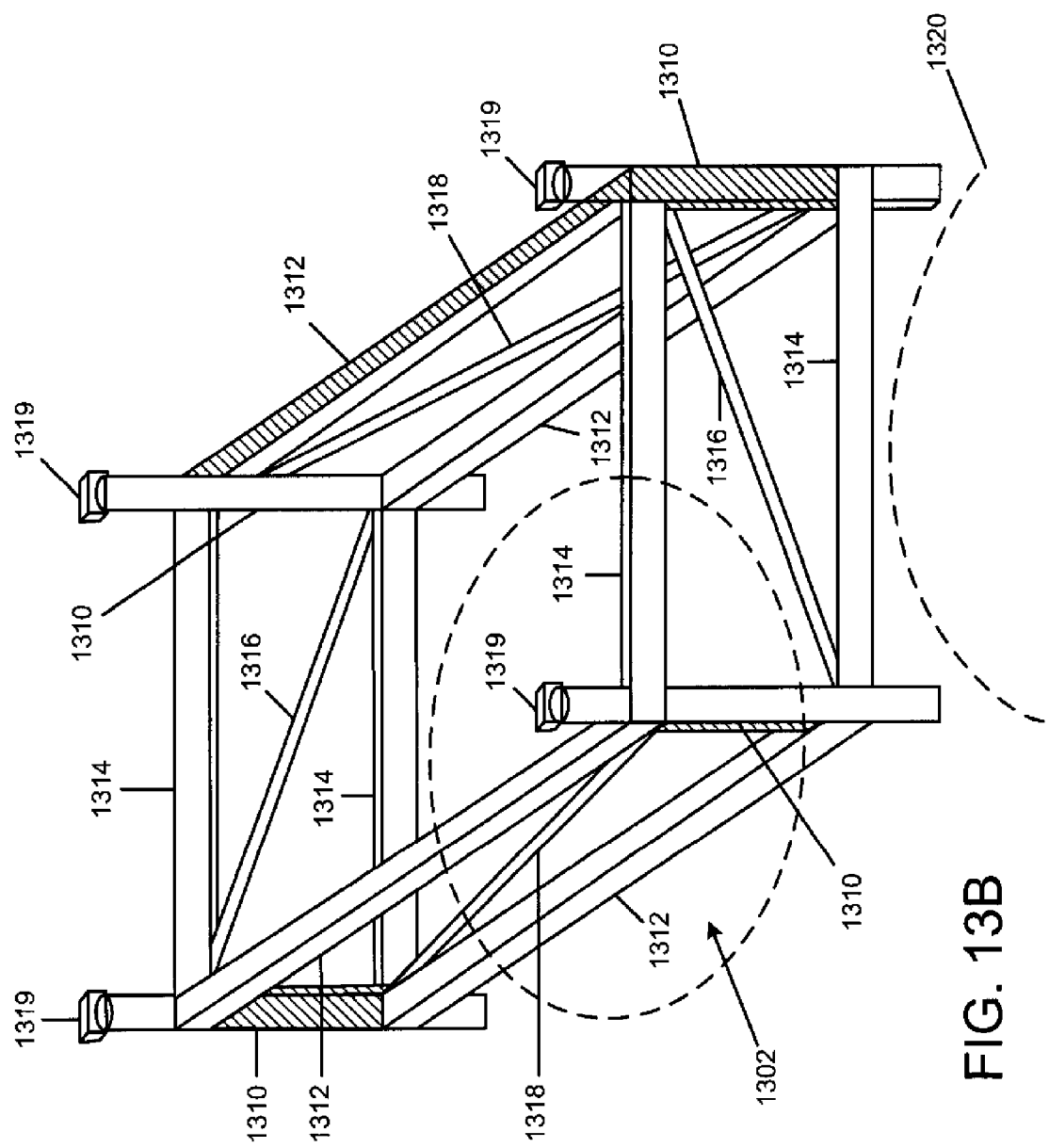
FIG. 13B is an illustration of a perspective view of a reel support bracket for supporting the reels shown in FIG. 13A, in accordance with the first exemplary embodiment of the present disclosure.

FIG. 13B is an illustration of a perspective view of a reel support bracket 1302 for supporting the aerial reels 1350A, 1350B, 1350C shown in FIG. 13A, in accordance with the first exemplary embodiment of the present disclosure. FIG. 13B shows a reel support bracket 1302 that is designed to attach the reel support device 1320 to the helicopter 1301. The reel support bracket 1302 has vertical sections 1310, long horizontal sections 1312, short horizontal section 1314, long diagonal sections 1318, and short diagonal sections 1316. A plurality of release mechanisms 1319 are attached to the vertical sections 1310 and also to the helicopter 1301 and facilitate the release of the aerial reels 1350A, 13508, 1350C from the helicopter 1301 at a predetermined time.

FIG. 13C is an illustration of a perspective view of a reel support device 1320 for supporting the aerial reels 1350A, 1350B, 1350C, 1350D shown in FIG. 13A, in accordance with the first exemplary embodiment of the present disclosure. FIG. 13C shows a perspective view of a reel support device 1320. Two reel troughs 1322A, 1322B are connected by reel trough supports 1326. A motor 1317 is attached to a first reel trough 1322A and can be used to force the aerial reel 1350 (as shown in FIG. 13E) to unwind or rewind the helicopter hose 1300 wrapped around the aerial reel 1350.

FIG. 13D is an illustration of a side view of a detail of the reel support device 1320 of FIG. 13C, in accordance with the first exemplary embodiment of the present disclosure. FIG. 13D shows a cross-section of the reel trough 1322. The reel troughs 1322 contains ball bearings 1330. The reel ends 1355A 1355B (shown in FIG. 13E) reside inside the reel troughs 1322A, 1322B and are supported by the ball bearings 1330 that are located within the reel troughs 1322A, 1322B.

Figure 13E:
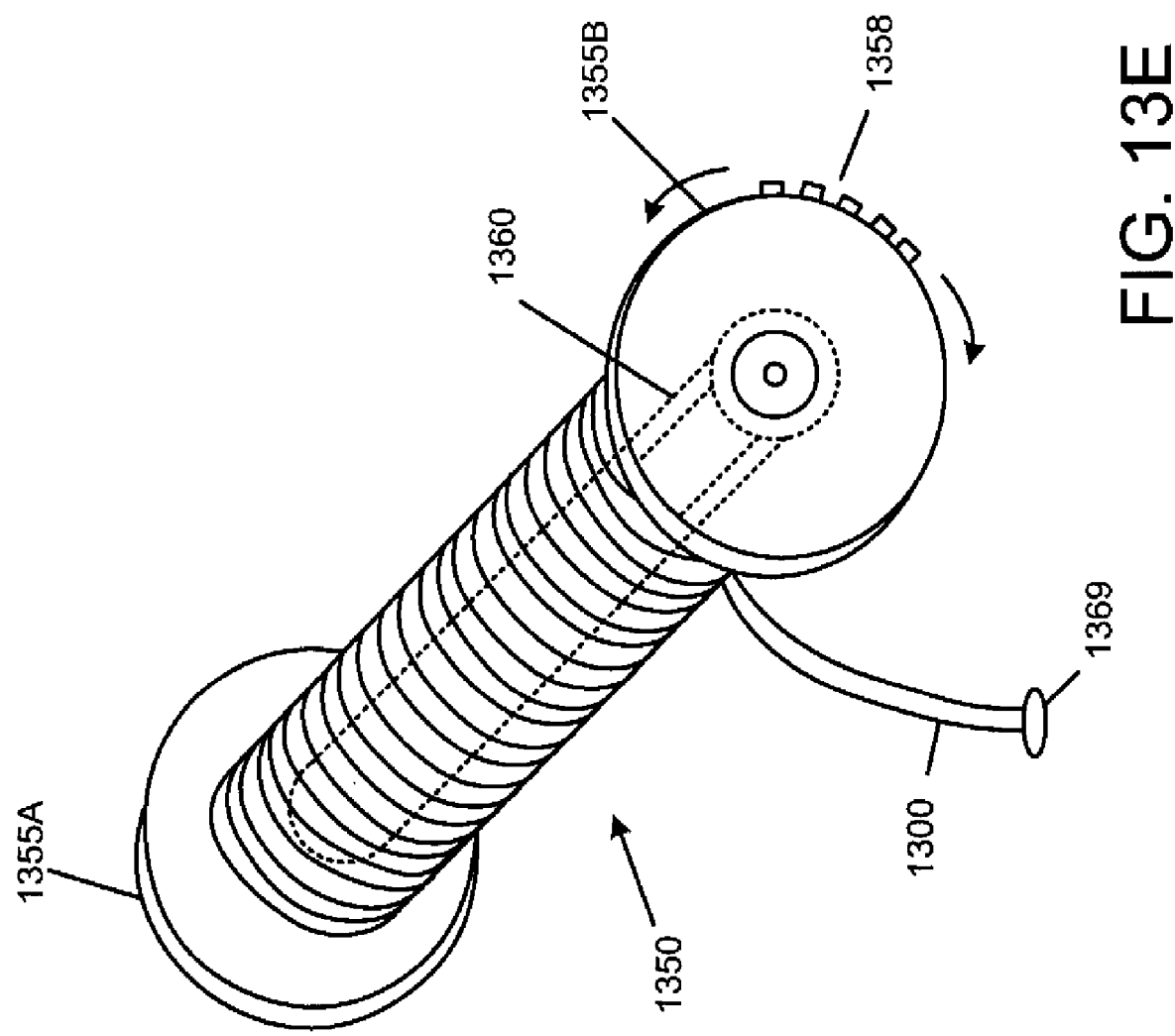
FIG. 13E is an illustration of a perspective view of the reel illustrated in FIG. 13A, in accordance with the first exemplary embodiment of the present disclosure.

FIG. 13E is an illustration of a perspective view of the aerial reel 1350 illustrated in FIG. 13A, in accordance with the first exemplary embodiment of the present disclosure.

FIG. 13E shows an aerial reel 1350 storing a length of helicopter hose 1300, which has a wfc connector 1369 on an end hanging from the aerial reel 1350. The aerial reel 1350 has reel ends 1355A, 1355B that are connected by a hollow reel cylinder 1360. At the center of the second reel end 1355B is a cylindrical cavity that passes through the hollow reel cylinder 1360. The gear teeth 1358 on the second reel end 1355B engage with gear teeth 1358 on the motor 1317 (shown in FIG. 13C) and urge the aerial reel 1350 to rotate.

Figure 13F:
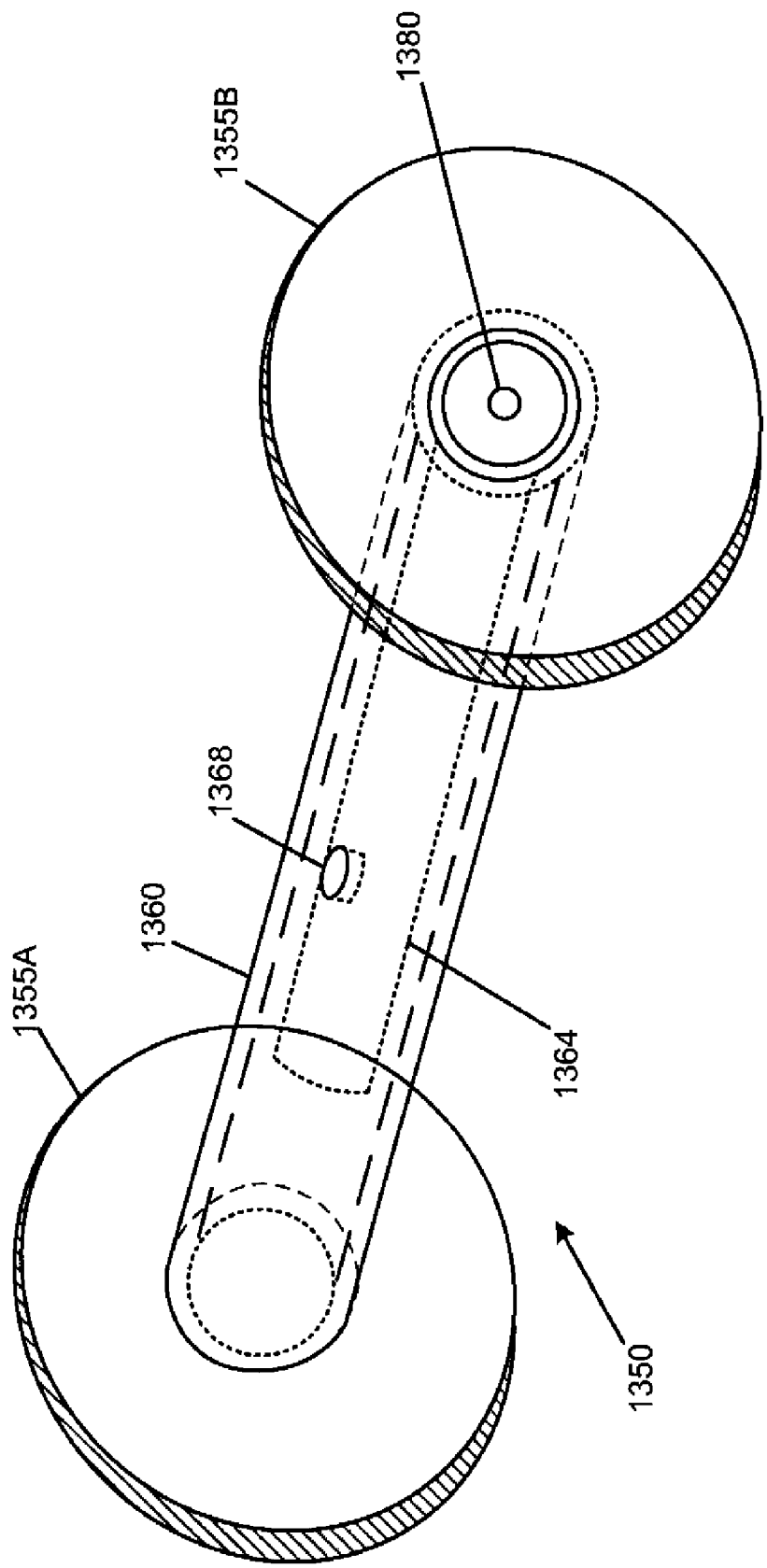
FIG. 13F is an illustration of a perspective view of a helicopter electrical booster pump, in accordance with the first exemplary embodiment of the present disclosure.

FIG. 13F is an illustration of a perspective view of a helicopter electrical booster pump 1364, in accordance with the first exemplary embodiment of the present disclosure. FIG. 13F shows a helicopter electrical booster pump 1364 located in the cavity in the center of the aerial reel 1350. The helicopter electrical booster pump 1364 is similar in function to the electric booster pump 436, but it may differ in size and shape so as to fit inside the aerial reel 1350. On the end of helicopter electrical booster pump 1364 located at reel end 1355B is the pump output 1380. The helicopter electrical booster pump 1364 has a pump input port 1368 attached to the reel cylinder 1360.

Figure 13G:
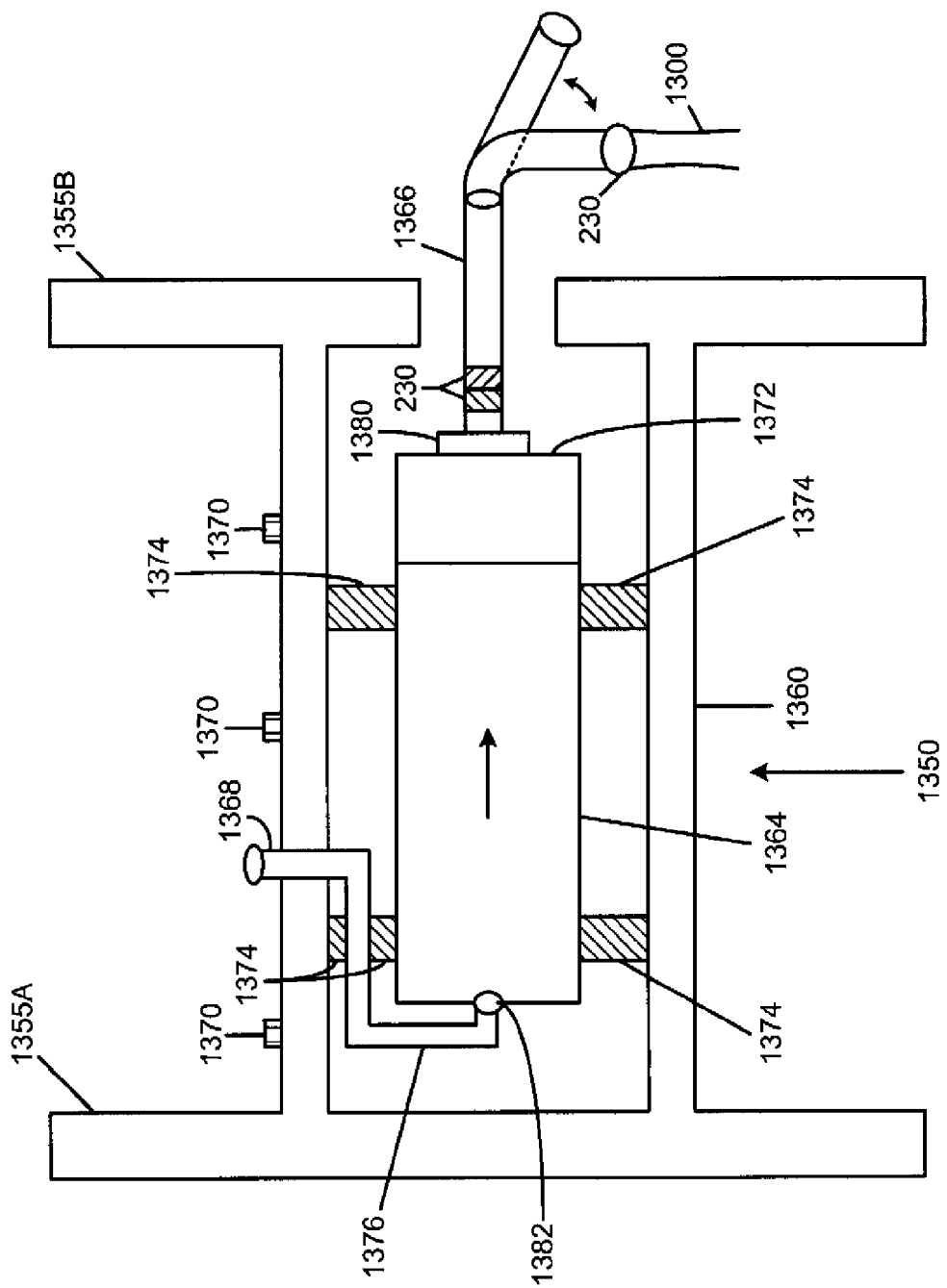
FIG. 13G is an illustration of a cross-sectional view of the aerial reel shown in FIG. 13E, in accordance with the first exemplary embodiment of the present disclosure.

FIG. 13G is an illustration of a cross-sectional view of the aerial reel 1350 shown in FIG. 13E, in accordance with the first exemplary embodiment of the present disclosure. The helicopter electrical booster pump 1364 is attached to a slip ring assembly 1372. The slip ring assembly 1372 is attached to a wfc connector 230 that is attached to a reinforced hose 1366. The reinforced hose 1366 has wfc connectors 230 on each end that carry along all of the electric power wires 120 and the communication wires 130 (as shown in FIG. 1A) used in helicopter hose 1300. The reinforced hose 1366 may bend only in an elbow type motion so that the electric power wires 120 and the communication wires 130 inside will not be twisted. The electrical booster pump 1364 is fixedly attached to the reel cylinder 1360 by at least one bracket 1374.

The slip ring assembly 1372 allows the reinforced hose 1366 to rotate freely with respect to helicopter electrical booster pump 1364 while the flow of the water and electrical power and the data communications are not interrupted. A slip ring is a method of making an electrical connection through a rotating assembly. Slip rings, also called rotary electrical interfaces, rotating electrical connectors, collectors, swivels or electrical rotary joints, are commonly found in electrical generators for AC systems and alternators. Slip ring construction is known to those having ordinary skill in the art.

Figure 14:
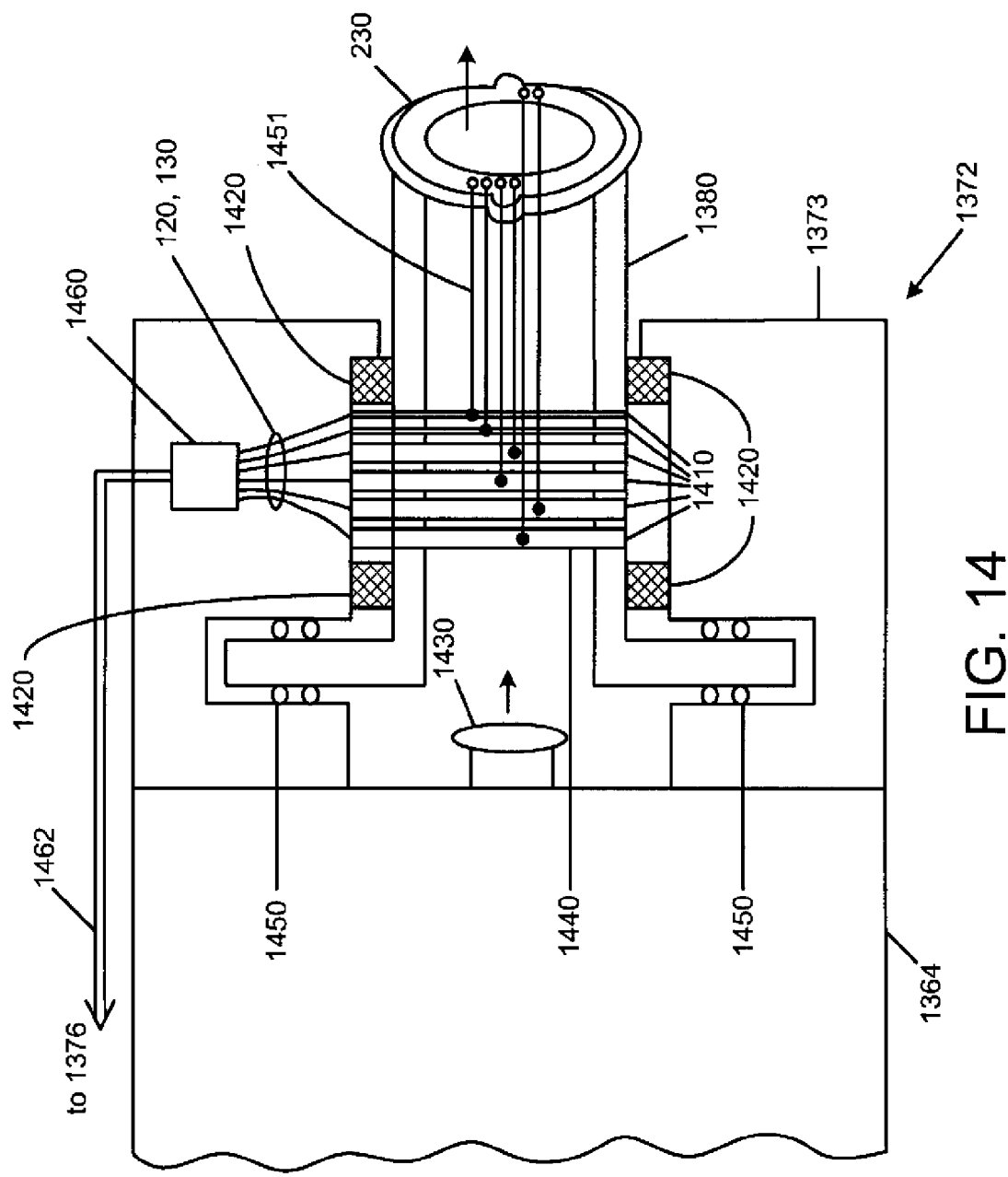
FIG. 14 is an illustration of a cross-sectional view of a slip ring assembly shown in FIG. 13G, in accordance with the first exemplary embodiment of the present disclosure.

FIG. 14 is an illustration of a cross-sectional view of the slip ring assembly 1372 shown in FIG. 13G, in accordance with the first exemplary embodiment of the present disclosure. A plurality of slip ring bands 1440 are mounted on the pump output shaft 1380. A plurality of brushes 1410 run in contact with the slip band rings 1440 and pass current through the wires 120, 130 in the wfc connector 230 and a cable box 1460. The electric power wires 120 and the communication wires 130 continue along the wire bundle 1462 and into a conduit 1376 where the electric power wires 120 are connected to the pump input port 1368 and to wfc connector 230. The electric power wires 120, the communication wires 130, and the water that enter the aerial reel 1350 are thus passed along to the helicopter electrical booster pump 1364.

A plurality of band wires 1451 are connected to the slip ring bands 1440 and to the corresponding pins on the wfc connector 230 on the end of pump input port 1368. The slip ring assembly 1372 has an outer shell 1373 fixedly attached to the helicopter electrical booster pump 1364. The outer shell 1373 cannot rotate relative to the aerial reel 1350 because the helicopter electrical booster pump 1364 is fixedly attached to the reel 1350. The pump output shaft 1380 is rotationally attached to the outer shell 1373 by a plurality of roller bearings 1420.

A plurality of watertight seals 1450 prevents water exiting a pump output 1430 from corning into contact with the brushes 1410. The free rotation of the reinforced hose 1366 is useful. When the first aerial reel 1350A, shown in FIG. 13A, is rotating and releasing the helicopter hose 1300, the helicopter hose 1300 segment between the first aerial reel 1350A and the second aerial reel 1350B will be fixed. The slip ring assembly 1372 is required to separate the motion of the first aerial reel 1350A and the second aerial reel 1350B. The conduit 1376 has the pump input port 1368 that is attached to the wfc connector 230. The other end of the conduit 1376 connects to a pump input 1382.

A plurality of pressure sensors 1370 is used to detect when the helicopter hose 1300 is at a last section of the aerial reel 1350. The helicopter hose 1300 will apply pressure on the pressure sensors 1370 until the helicopter hose 1300 is removed from the aerial reel 1350. When the aerial reel 1350 is almost empty, the aerial reel 1350 is released from the helicopter 1301 via the release mechanisms 1319 and allowed to fall towards the ground with the adjacent lengths of helicopter hose 1300. The aerial reel 1350 offers impact protection to the helicopter electrical booster pump 1364 that is located at its center.

From FIG. 13A, the group of aerial reels 1350A, 1350B, 1350C comprises a continuous pipeline 400 which has helicopter electrical booster pumps 1364 to boost the water pressure such that water can be pumped for the entire length of the pipeline 400. A continuous length of electric power wires 120 delivers power to the helicopter electrical booster pumps 1364 and a continuous length of communication wires 130 allow for monitoring and control of the helicopter electrical booster pumps 1364.

The group of aerial reels 1350A, 1350B, 1350C is attached to the helicopter 1301 and a loose end of the first aerial reel 1350A is attached to the base pump 420. The helicopter 1301 flies toward a fire location and pays out the helicopter hose 1300. When the first aerial reel 1350A is almost empty, it is detached, via a first release mechanism 1319A, from the helicopter 1301 and is lowered towards the ground by remaining attached to the helicopter hose 1300 on the second aerial reel 1350B, which is deploying. When the second aerial reel 1350B is almost empty, the second aerial reel 1350B is released from the helicopter 1301 by a second release mechanism 1319B and is lowered towards the ground by its connection to helicopter hose 1300 on the third aerial reel 1350C, which is being deployed.

If the helicopter 1301 arrives at its destination and is still carrying the third aerial reel 1350C and the reel of the conventional hose 1384, it releases them with a third and fourth release mechanism 1319C, 1319D and lowers to the ground these remaining reels 1350C, and reel of conventional hose 1384, by cables attached to the winch 1388. The firemen on the ground then unspool as much of helicopter hose 1300 as needed and attach it to a distal end 1369 of the conventional hose 1384. The conventional hose 1384 is used to fight the fire using the conventional nozzle 1381.

The helicopter 1301 might hover and spray water onto the fire. It is possible that the helicopter 1301 might be piloted by remote control. An onboard GPS device might send back the exact location of the helicopter 1301 via the communication wires 130 in the helicopter hose 1300. A remote controlled helicopter 1301 might be used to drop supplies to firemen, or even rescue firemen, in a smoky or windy zone that is too dangerous for a piloted helicopter to enter.

A test box similar to the test box 470 can be used to insure the integrity of the entire length of the wire circuits on the helicopter hose 1300 before and during a flight. Breakable bolts may be used to attach the aerial reels 1350A, 1350B, 1350C to the helicopter 1301. These bolts would break if the tension became excessively large on the helicopter hose 1300 and posed a safety risk to the helicopter 1301.

In order to avoid excessive twisting of the helicopter hose 1300, it may be necessary to place a slip ring assembly 1372 to both ends of the aerial reel 1350. The need will depend on exactly how the aerial reels 1350 move through the air when they are released from the helicopter 1301.

Figure 15:
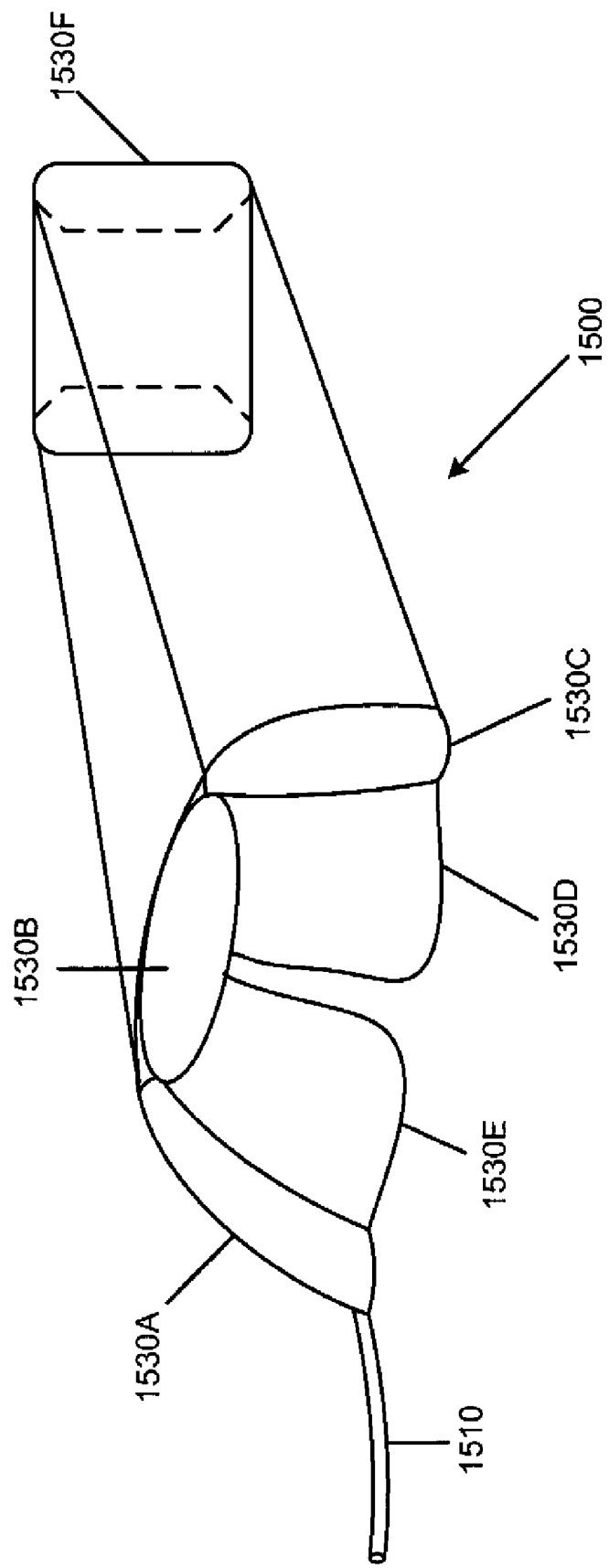
FIG. 15 is a perspective view of a portable water tent, in accordance with the first exemplary embodiment of the present disclosure.

FIG. 15 is a perspective view of a portable water tent 1500, in accordance with the first exemplary embodiment of the present disclosure. The electric power wires 120 that are part of the pipeline 400 can be used to power a variety of devices that can be used to filter and purify the air breathed by firemen at the scene of a fire. These devices may have to be designed to handle the voltages that are used in the pipeline 400. Firefighters often carry lightweight portable tents that have a metallic coating so as to reflect the heat of a fire away from their bodies. They enter this tent when they are at risk of being burned and when there is no safe escape route. Since the pipeline 400 carries water, the firemen have access to water if they are near the pipeline 400.

A portable water tent 1500 is a reflective tent that can be partially filled with water and which gives extra protection from heat to the firemen inside. The water will absorb much of the heat of a fire. It has a tent hose 1510 that can be connected to a wired fire hose 100 (shown in FIG. 1A) and which will allow portions of the water tent 1500 to be filled with water. The portable water tent 1500 may be constructed from a plurality of interconnected chambers which fill with water. The chambers form the sides 1530A, 1530C of the water tent 1500, the top 1530B of the water tent 1500, a pair of entry chambers 1530D, 1530E for the water tent 1500, and a distal end 1530F of the water tent 1500.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A supply line system for conveying a fluid, the system comprising:
   at least a first flexible conduit segment and a second flexible conduit segments;
   at least one conduit connector joining said first flexible conduit segment with said second flexible conduit segment, thereby mating at least one fluid path;
   a plurality of electric power wires coupled with each of the first and second flexible conduit segments;
   at least one electrical connector with said at least one conduit connector, the at least one electrical connector mating corresponding electric power wires between the first and second flexible conduit segments;
   a first pump connected between the first flexible conduit segment and a source of fluid;
   at least one second electrically-powered pump connected to said second flexible conduit segment and in communication with said at least one fluid path;

and
an electric power source electrically connected to the at least one second electrically-powered pump via the electric power wires.

2. The system of claim 1, further comprising a system base unit connected between the source of fluid and the first flexible conduit segment.

3. The system of claim 1, further comprising a plurality of communication wires carrying a plurality of communication signals, said communication wires coupled with the first and second flexible conduit segments, said communication wires connected to a plurality of network devices via a plurality of a network connectors.

4. The system of claim 3, further comprising:
a first control for controlling operation of at least one of the first pump and second electrically-powered pumps and an adapter, dependent on a signal from said network device; and a second control for manual override the first control.

5. The system of claim 3, further comprising at least one voice/data device connected to the communication wires.

6. The system of claim 3, further comprising a system computer in communication with the plurality of network devices.

7. The system of claim 1, wherein a location of said at least one second electrically-powered pump connected to said second flexible conduit segment is determined by relative distance along the fluid path, wherein the location of said at least one second electrically-powered pump further determined by pump altitude difference from a third electrically-powered pump.

8. The system of claim 1, further comprising:
a three dimensional positioning system capable of determining a location of an end of at least one of the first and second flexible conduit segments, said location conveyed to a system computer via a plurality of communication wires wherein said system computer is capable of making calculations to determine a need for said second electrically-powered pump connected to said second flexible conduit segment.

9. The system of claim 8, further comprising:
a message generated by said system computer containing said determination; and
a communication means to deliver said message to installation personnel at a potential pump location.

10. The system of claim 1, further comprising:
a third flexible conduit segment of said conduit segments further comprising a single passage for fluid flow;
said third flexible conduit segment attached to a conventional hose adapter; and
said conventional hose adapter having a mating connector to a third flexible conduit segment connector and also a mating connector to a conventional hose connector.

11. The system of claim 1, further comprising:
a fourth flexible conduit segment comprising a plurality of passages for fluid flow;
said passages comprising a first group of passages for conveying the fluid;
said passages comprising a second group of passages for spraying the fluid; and
said second group of passages positioned to provide a spray in a plurality of directions.

12. The system of claim 11, further comprising a flow stop device for stopping a flow of said fluid at a distal end of said fourth flexible conduit segment.

13. The system of claim 11, further comprising said first flexible conduit segment and second flexible conduit segment coupled with a plurality of flexible flat power wires.

14. The system of claim 1 further comprising the electric power wires in said first and second flexible conduit segments located sufficiently proximate to a fluid in said first and second flexible conduit segments to facilitate a transfer of heat from said electric power wires to said fluid.

15. The system of claim 1, further comprising:
an adapter formed at least partially within a closed container, said container having a first orifice and a second orifice;
said first orifice comprising a mating connector connected to said first flexible conduit segment;
said second orifice comprising a second mating connector mated to a second flexible conduit segment;
said first orifice and second orifice connecting corresponding wires between devices connected to said adapter.

16. The system of claim 15, further comprising:
said adapter connecting a plurality of said flexible conduit segments comprising a multidimensional array, whereby said adapter manages fluid flow in said flexible conduit segments; and
said multidimensional array capable of steering said fluid along a plurality of paths through control from a remote location.

17. The system of claim 1 further comprising:
a reservoir in fluid communication with at least first and second flexible conduit segments;
said reservoir receiving and storing fluid from at least one of the first pump and the second electrically-powered pump powered by the electric power source;
at least one of said first pump and second electrically-powered pump on an output side of the reservoir being in an off state to minimize an electric current flow in the electric power wires of the flexible conduit segments; and
at least one of said first pump and second electrically-powered pump on an input side of said reservoir in an on state to fill said reservoir;
an input pool hose in fluid communication with the reservoir, whereby the input pool hose delivers fluid to the reservoir;
an output pool hose in fluid communication with the reservoir, whereby the output pool hose extracts fluid from the reservoir and whereby the output pool hose prevents said power wires from contacting said fluid in the reservoir; and
a wire bundle that routes said electric power wires around said reservoir.

18. The system of claim 1, further comprising:
a reservoir in fluid communication with at least two of the flexible conduit segments;
said reservoir receiving and storing fluid from at least one of the first pump and the second electrically-powered pump powered by the electric power source;
at least one of said first pump and second electrically-powered pump on an output side of the reservoir being in an on state to withdraw water from the reservoir;
at least one of said first pump and second electrically-powered pump on an input side of said reservoir being in an off state to minimize an electric current flow in the electric power wires of the flexible conduit segments;
an input pool hose in fluid communication with the reservoir, whereby the input pool hose delivers fluid to the reservoir;

an output pool hose in fluid communication with the reservoir, whereby the output pool hose extracts fluid from the reservoir and whereby the output pool hose prevents said electric power wires from contacting said fluid in the reservoir; and a wire bundle that routes said electric power wires around said reservoir.

19. The system of claim 1, further comprising:
said first and second flexible conduit segments being a flexible hose segment;
said flexible hose segment stored on at least one reel; and
at least one of said reels attached to an aerial vehicle.

20. The system of claim 19, further comprising a holder attached to said aerial vehicle by at least one release mechanisms supporting at least one of the reels, thereby enabling detachment of said reel from said aerial vehicle.

21. The system of claim 20, further comprising a motor mechanically connected to the reel, wherein the motor mechanically manipulates the reel, whereby the motor aids in retracting and deploying the flexible hose segment on the reel.

22. The system of claim 19, further comprising:
said reel having a central cavity; and
said central cavity containing a cavity pump.

23. The system of claim 22, further comprising:
at least one slip ring assembly attached to the cavity pump, said slip ring assembly enabling reel to rotate;
an end connection of the reel is fixed; and said slip ring assembly providing a continuous electrical and fluid path between the flexible hose segments on adjacent reels.

24. The system of claim 19 further comprising:
at least one sensor on the reel sensing a quantity of the flexible hose segment on said reel.

25. The system of claim 1, further comprising;
a protective water tent connecting to at least one of the first and second flexible conduit segments, at least one of said first and second flexible conduit segment supplying fluid at least to portions of the protective water tent.

26. A supply line system for conveying a fluid, the system comprising:
at least a first flexible conduit segment and a second flexible conduit segment;
at least one conduit connector joining said first flexible conduit segment with said second flexible conduit segment, thereby mating at least one fluid path;
a plurality of electric power wires coupled with each of the first and second flexible conduit segments;
at least one electrical connector with said at least one conduit connector, the at least one electrical connector mating corresponding electric power wires between the first and second flexible conduit segments;
a first pump connected between the first conduit segment and a source of fluid;
at least one second electrically-powered pump connected to said second flexible conduit segment and in communication with said at least one fluid path;
an electric power source electrically connected to the at least one second electrically-powered pump via the electric power wires, wherein said first and second flexible conduit segments further comprise at least one wired hose segment; and
a mobile reel supporting the wired hose segment, wherein one end of the wired hose segment is attached to a stationary object independent of the mobile reel.

* * * * *

UNITED STATES PATENT AND TRADEMARK OFFICE
CERTIFICATE OF CORRECTION

PATENT NO. : 7,819,345 B2  Page 1 of 1
APPLICATION NO. : 12/211517
DATED : October 26, 2010
INVENTOR(S) : Shoap It is certified that error appears in the above-identified patent and that said Letters Patent is hereby corrected as shown below:

Col. 16, Claim 1, Line 53, "segments" should be --segment--.

Col. 18, Claim 17, Line 28, insert --the-- after --least--.

Signed and Sealed this
Fifteenth Day of March, 2011

David J. Kappos
*Director of the United States Patent and Trademark Office*